(12) United States Patent
Foque

(10) Patent No.: US 11,544,232 B2
(45) Date of Patent: Jan. 3, 2023

(54) EFFICIENT TRANSACTION LOG AND DATABASE PROCESSING

(71) Applicant: Western Digital Technologies, Inc., San Jose, CA (US)

(72) Inventor: Maarten Foque, Steendorp (BE)

(73) Assignee: Western Digital Technologies, Inc., San Jose, CA (US)

(*) Notice: Subject to any disclaimer, the term of this patent is extended or adjusted under 35 U.S.C. 154(b) by 491 days.

(21) Appl. No.: 16/710,440

(22) Filed: Dec. 11, 2019

(65) Prior Publication Data
US 2021/0182246 A1 Jun. 17, 2021

(51) Int. Cl.
*G06F 16/18* (2019.01)
*G06F 16/23* (2019.01)

(52) U.S. Cl.
CPC ...... *G06F 16/1865* (2019.01); *G06F 16/2365* (2019.01)

(58) Field of Classification Search
CPC .......................... G06F 16/1865; G06F 16/2365
USPC ....................................................... 707/703
See application file for complete search history.

(56) References Cited

U.S. PATENT DOCUMENTS

| | | | |
|---|---|---|---|
| 6,185,663 B1 * | 2/2001 | Burke | G06F 11/1471 714/E11.13 |
| 8,572,031 B2 | 10/2013 | Merriman et al. | |
| 9,430,503 B1 * | 8/2016 | Delgado | G06F 16/14 |
| 10,191,765 B2 | 1/2019 | Kim et al. | |
| 2008/0301256 A1 * | 12/2008 | McWilliams | G06F 12/0806 714/E11.178 |
| 2009/0217274 A1 | 8/2009 | Corbin et al. | |
| 2012/0011098 A1 | 1/2012 | Yamada | |
| 2014/0019495 A1 * | 1/2014 | Borthakur | G06F 11/1435 707/827 |
| 2015/0242479 A1 | 8/2015 | Cheenath et al. | |
| 2016/0371356 A1 * | 12/2016 | Lee | G06F 16/273 |

(Continued)

FOREIGN PATENT DOCUMENTS

KR 1020080102622 A 11/2008

OTHER PUBLICATIONS

Unknown, Arakoon Introduction, Dec. 2018, website available at https://openvstorage.gitbook.io/arakoon/.

(Continued)

*Primary Examiner* — James Trujillo
*Assistant Examiner* — Fariborz Khoshnoodi
(74) *Attorney, Agent, or Firm* — Patent Law Works LLP

(57) ABSTRACT

The described methods, systems, and other aspects can, by way of example, advantageously provide efficient metadata storage in a master-slave node-based metadata store of a distributed storage system. An example method may write a first transaction entry in a transaction log of a first node based on a first request for a first operation associated with a first storage object. The method may then request a second node write the first transaction entry in a transaction log of the second node based on the first request. While awaiting a first acknowledgment of a completion of a writing of the first transaction entry in the transaction log of the second node, the method may proceed to write one or more subsequent transaction entries in the transaction log of the first node based on one or more subsequent requests for one or more operations associated with one or more storage objects.

20 Claims, 10 Drawing Sheets

(56) References Cited

U.S. PATENT DOCUMENTS

| | | | |
|---|---|---|---|
| 2017/0132271 A1* | 5/2017 | Jiao | G06F 16/122 |
| 2017/0300552 A1 | 10/2017 | Mandadi et al. | |
| 2018/0096045 A1 | 4/2018 | Merriman et al. | |
| 2018/0181604 A1* | 6/2018 | Marohn | G06F 16/00 |
| 2018/0322156 A1* | 11/2018 | Lee | G06F 16/2343 |
| 2019/0042638 A1* | 2/2019 | Jujjuri | G06F 16/2365 |
| 2019/0392072 A1* | 12/2019 | Ben-Romdhane | G06F 16/27 |
| 2021/0034643 A1* | 2/2021 | Platt | G06F 16/275 |

OTHER PUBLICATIONS

International Search Report and Written Opinion of Application No. PCT/US2020/025280, dated Aug. 28, 2020 (10 pages).

\* cited by examiner

EFFICIENT TRANSACTION LOG AND DATABASE PROCESSING

BACKGROUND

The present disclosure relates to distributed storage systems. In a more particular example, the present disclosure relates to efficient processing of metadata storage.

The rise in electronic and digital device technology has rapidly changed the way society communicates, interacts, and consumes goods and services. Digital technology enables a variety of electronic devices to be available that can be used for a variety of purposes and are relatively cheap. Specifically, modern electronic devices, such as desktop computers, laptops, smartphones, and tablets, allow a user to have access to a variety of useful applications nearly constantly. Using such applications results in the generation of an increasingly huge amount of data. Storing and retrieving the produced data efficiently is a significant challenge.

As the amount of data and rate of change of stored data increases, the ability to collect accurate and timely information about the stored data becomes both more important and more challenging. For example, storage system parameters, such as storage capacity, may change with every data storage transaction processed by a storage system and near real-time information on storage capacity may be desired for making storage allocation and other storage management decisions.

Some solutions use a metadata database (DB) or key-value stores (KVSs) in a large-scale distributed storage system (DSS) to log the transactions processed by the DSS. One such log may be referred to as a transaction log (TLOG). Additionally, some DSS solutions include a database(s) that store the specifics of each transaction processed by the DSS. However, when writing data and still guaranteeing consistency, the architectures of these solutions still suffer from latency that constricts throughput and causes bottlenecks. This latency problem becomes increasingly worse (even up to the point of failure or impracticability) as the DSS solutions are required to scale up because of the increase in the number of storage requests they receive and process.

SUMMARY

The present disclosure generally relates to novel technology that efficiently processes transaction log and metadata operations, and thereby reduces latency while still guaranteeing consistency relative to other solutions, such as those described in the Background.

In one innovative aspect, a computer-implemented method, may include: writing a first transaction entry in a transaction log of a first node based on a first request for a first operation associated with a first storage object; requesting a second node write the first transaction entry in a transaction log of the second node based on the first request; and while awaiting a first acknowledgment of a completion of a writing of the first transaction entry in the transaction log of the second node, writing one or more subsequent transaction entries in the transaction log of the first node based on one or more subsequent requests for one or more operations associated with one or more storage objects.

In another innovative aspect, a distributed storage system may include a cluster of storage nodes including a first node and a second node and one or more node controllers associated with the cluster of storage nodes. The one or more node controllers include at least one processor configured to: write a first transaction entry in a transaction log of the first node based on a first request for a first operation associated with a first storage object; request the second node writes the first transaction entry in a transaction log of the second node based on the first request; and while awaiting a first acknowledgment of a completion of a writing of the first transaction entry in the transaction log of the second node, write one or more subsequent transaction entries in the transaction log of the first node based on one or more subsequent requests for one or more operations associated with one or more storage objects.

In another innovative aspect, a system, may include: means for writing a first transaction entry in a transaction log of the first node based on a first request for a first operation associated with a first storage object; means for requesting the second node write the first transaction entry in a transaction log of the second node based on the first request; and means for writing one or more subsequent transaction entries in the transaction log of the first node based on one or more subsequent requests for one or more operations associated with one or more storage objects, while awaiting a first acknowledgment of a completion of a writing of the first transaction entry in the transaction log of the second node.

Various embodiments of one or more of the above aspects include corresponding methods, computer systems, apparatus, and computer programs recorded on one or more computer storage devices.

Various implementations may include one or more of the following features: responsive to receiving the first acknowledgment of the completion of the writing of the first transaction entry in the transaction log of the second node, writing first metadata associated with the first request in a transaction database of the first node; where receiving the one or more subsequent requests includes, after writing the first metadata associated with the first request in the transaction database of the first node, receiving a subsequent request for an operation associated with a second storage object; writing the one or more subsequent transaction entries includes writing a subsequent transaction entry in the transaction log of the first node based on the subsequent request; requesting the second node write the subsequent transaction entry in the transaction log of the second node based on the subsequent request; where the subsequent transaction entry is written in the transaction log of the first node after the first metadata associated with the first request is written in the transaction database of the first node; where the subsequent transaction entry is written in the transaction log of the second node after the first metadata associated with the first request is written in a transaction database of the second node; requesting the second node write a second transaction entry in the transaction log of the second node based on a second request included in the one or more subsequent requests; receiving a second acknowledgment of a completion of the writing of the second transaction entry in the transaction log of the second node; writing a second metadata associated with the second request in the transaction database of the first node; responsive to the completion of the writing of the first transaction entry in the transaction log of the second node, writing a first metadata associated with the first request in a transaction database of the second node; where the first operation may include one of a read operation, a write operation, and a delete operation associated with the first storage object; while awaiting the first acknowledgment of the completion of the writing of the first transaction entry in the transaction log of the second node, requesting the second node write the one or more subsequent transaction entries in the transaction log of the second node based on the one or more subsequent requests; where the one or more subsequent requests may include a plurality of subsequent requests and the one or more operations may include a plurality of operations associated with one or more storage objects; where writing the one or more subsequent transaction entries in the transaction log of the first node based on the one or more subsequent requests may include, while awaiting the first acknowledgment, sequentially writing a plurality of subsequent transaction entries in the transaction log of the first node based on the plurality of subsequent requests, and requesting the second node sequentially write the plurality of subsequent transaction entries in the transaction log of the second node; determining a failure to write a certain entry from the one or more subsequent transaction entries in one of the transaction log of the first node and the transaction log of the second node, responsive to determining the failure, terminating a processing of a certain request from the one or more subsequent requests that is associated with the certain entry, and providing a failure notification to a client that submitted the certain request associated with the certain entry; requesting the client retransmit the request; where the one or more subsequent requests may include a plurality of subsequent requests, the one or more operations may include a plurality of operations associated with one or more storage objects, and the one or more node controllers are further configured to, while awaiting the first acknowledgment, sequentially write a plurality of subsequent transaction entries in the transaction log of the first node based on the plurality of subsequent requests, and request the second node sequentially write the plurality of subsequent transaction entries in the transaction log of the second node.

Various implementations of the described techniques may include hardware, a method or process, or computer software on a computer-accessible medium.

The technology described herein is advantageous in a number of respects, including being more reliable, efficient, and scalable than other computer data storage architectures for some applications. Further, the technology can guarantee the reliability and consistency of metadata storage; it can scale up to accommodate increased metadata storage operations in a large scale DSS; it can minimize the waiting time to process metadata in response to a client request, and thus the latency of the associated DSS in handling a client request can be improved and the throughput of the DSS in handling object storage can be increased.

It should be understood, however, that the above list of features is not all-inclusive and many additional features and advantages, such as but not limited to those discussed below, are contemplated, and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The techniques introduced herein are illustrated by way of example, and not by way of limitation, in the figures of the accompanying drawings in which like reference numerals are used to refer to similar elements.

DETAILED DESCRIPTION

For purposes of illustration, the techniques described herein are presented within the context of distributed storage systems. In particular, the techniques described herein make reference to metadata stores for a large-scale distributed storage system. However, references to, and illustrations of, such environments and embodiments are strictly used as examples and are not intended to limit the mechanisms described to the specific examples provided. The techniques described are equally applicable to any database using a transaction-like replication mechanism, or any system with transactions and an associated transaction log.

According to the technology disclosed herein, a cluster of nodes can be configured in a metadata store for improved consistency in a large-scale distributed storage system. The cluster of nodes includes a master node and one or more slave nodes to handle metadata storage operations related to client access to objects stored in the storage system. In handling multiple client requests for object storage, the technology can write corresponding transaction entries in transaction logs of the master node and the slave node(s) efficiently. For example, the technology can write a first transaction entry in a transaction log of the master node and slave node(s) based on a first client request for a first operation associated with a first storage object. Without having to await acknowledgments from the slave nodes for the first request, the technology can continue to write one or more subsequent transaction entries in the transaction log of the master node based on one or more subsequent requests for one or more operations associated with one or more storage objects. Thus, the master node can start to process a subsequent request without waiting for the completion of the processing of the first request, which can significantly improve the efficiency of the distributed storage system DSS in handling metadata storage.

Figure 1:
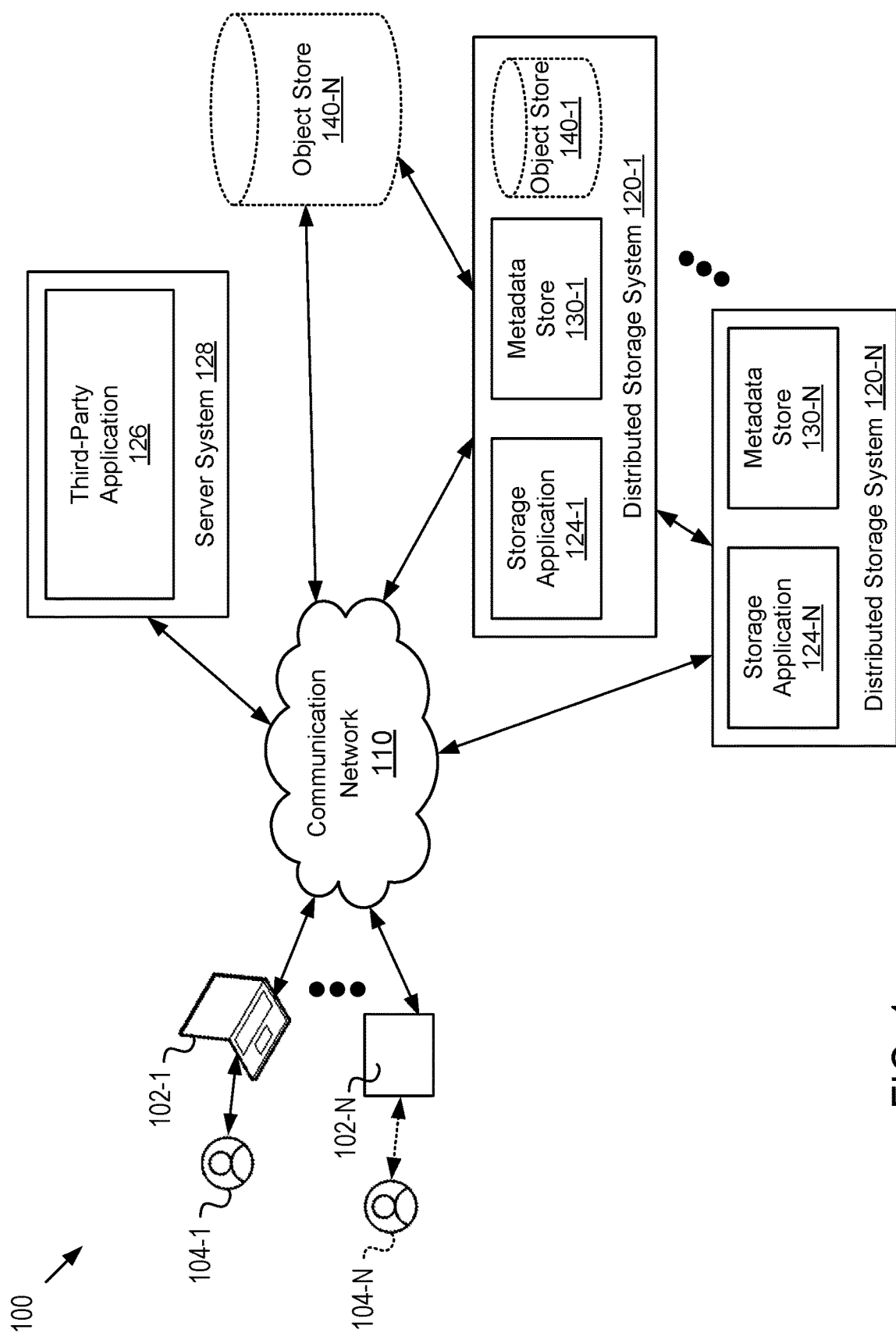
FIG. 1 illustrates a block diagram of an example data storage system.

FIG. 1 illustrates a block diagram of an example storage system 100, in which improved metadata storage operations are implemented. As shown, the system 100 includes client systems 102 (e.g., client systems 102-1 and 102-N), server system 128, distributed storage systems 120-1 . . . 120-N, and object stores 140-1 . . . 140-N associated with the distributed storage systems. The components 102, 128, 120, and/or 140, and/or their sub-components, may be interconnected directly or via a communication network 110. For simplicity in some cases, depending on context, the client systems 102-1 . . . 102-N may also be referred to herein individually or collectively as client system 102 or client 102, the object stores 140-1 . . . 104-N may be referred to herein individually or collectively as object store(s) 140, the distributed storage systems 120-1 . . . 120-N may be referred to herein individually or collectively as distributed storage system(s) 120 or DSS(s) 120, the metadata stores 130-1 . . . 130-N may be referred to herein individually or collectively as metadata store(s) 130, the object stores 140-1 . . . 140N may be referred to herein individually or collectively as object store(s) 140, and the storage applications 124-1 . . . 124 N may be referred to herein individually or collectively as storage application(s) 124.

The communication network 110 may include any number of private and public computer networks. The communication network 110 may include network(s) having any of a variety of network types, including local area networks (LANs), wide area networks (WANs), wireless networks, virtual private networks, wired networks, the Internet, personal area networks (PANs), object buses, computer buses, and/or a combination of any suitable communication mediums via which devices may communicate in a secure or insecure fashion.

Data may be transmitted via the network 110 using any suitable protocol. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (short messaging service (SMS), internet message access protocol (IMAP), etc.), or other suitable protocols.

A client system 102 may comprise an electronic computing device, such as a personal computer (PC), a laptop, a smartphone, a tablet, a mobile phone, a wearable electronic device, server, server appliance, or any other electronic device or computing system capable of communication with the communication network 110. The client system 102 may store one or more client applications in non-transitory memory. A client application may be executable by a computer processor of the client system 102. In some example embodiments, a client application includes one or more applications such as, but not limited to, data storage applications, search applications, communication applications, productivity applications, game applications, word processing applications, or any other applications. A client application may include a web browser and/or code executable thereby in some cases. In some embodiments, a client system 102 may include an application for creating, modifying, and deleting objects, which may be stored in the object store 140. For instance, the application may be specifically customized for communication with the third-party application 126 and/or storage application 124, such as an application adapted to configure and/or utilize programming interfaces of the storage application 124. In some embodiments, the third-party application(s) 126 hosted by the server system 128 may embody a client of the storage application 124, as it may access the functions of the storage application 124 using various programmatic interfaces surfaced thereby (e.g., to create, store, retrieve, delete, etc., objects stored in the object storage).

The client systems 102, distributed storage systems 120, and/or server system 128 may send/receive requests and/or send/receive responses, such as but not limited to HTTP(S) requests/responses, to/from one another. A client system 102 may present information, such as visual, audio, tactile, and/or other information via output devices, such as displays, audio reproduction devices, vibration mechanism, etc., based on information generated by a client system 102 and/or received from server system 128 and/or distributed storage system 120.

Users may interact with various client systems 102 to provide input and receive information. For instance, as illustrated, users 104-1 and 104-N may interact with client systems 102-1 and 202-N by utilizing the operating system and/or various applications executing on the client systems 102-1 and 202-N.

In some embodiments, a client application (e.g., a client application executing on a client system 102, the third-party application 126, etc.) may send a request (also referred to as an object storage request) to the distributed storage systems 120 or object stores 140 to store, update, delete, or retrieve a particular file stored at the distributed storage systems 120 and/or object stores 140 through the communication network 110. For example but not limitation, a user 204 may update a document using a word processing application and may save the updated version to the distributed storage systems 120 and/or object stores 140, in which case the word processing application transmits a request to the distributed storage systems 120 or object stores 140 to store the update(s).

An object storage request may include information describing an object being created and/or updated, such as a file name, the data comprising the update(s), a client identifier, an operation type, etc., and the storage applications 124 may use that information to record the update(s), as described herein. In another example, a client application (e.g., an application executing on a client system 102, the third-party application 126, etc.) may request an object or portion thereof, a list of objects matching certain criteria, etc., in which case the request may include corresponding information (e.g., an object identifier, search criteria (e.g., time/date, keywords, etc.), and receive an object list or the object itself from the storage application 124. Numerous other use cases are also applicable and contemplated.

As shown in FIG. 1, a distributed storage system 120 may include a storage application 124 and may be coupled to and/or include a metadata store 130. The storage application 124 may include components that perform various tasks, as discussed with reference to at least FIGS. 2B and 3. The storage application 124, and/or its components, may be coupled for communication to one another and to other components of the system, such as the metadata stores 130, the object stores 140, an application executing on a client system 102, the third-party application 128, etc.

The storage application 124 may provide an object storage service, manage data storage using the metadata stores 130 and the object stores 140 (e.g., store, retrieve, and/or other manipulate data in the metadata stores 130 and the object stores 140, etc.), process requests received from various entities (e.g., client systems 102, server system 128, local application, etc.), provide for concurrency, provide for data redundancy and replicate data, perform garbage collection, and perform other acts, as discussed further herein. The storage application 124 may include various interfaces, such as software and/or hardware interfaces (e.g., application programming interface(s) (API(s)) that may be accessed (e.g., locally, remotely, etc.) by components of the system 100, such as various client applications, the third-party application 126, etc.

In some embodiments, the storage application 124 may be a distributed application that is implemented in two or more computing systems (e.g., distributed storage systems 120-1 and 120-N). In some embodiments, an object store 140 may comprise a plurality of storage devices, servers, software applications, and other components, such as but not limited to any suitable enterprise data grade storage hardware and software. In some embodiments, the storage application 124 may be a local application receiving local and/or remote storage requests from other clients (e.g., local applications, remote applications, etc.).

In a non-limiting example of the distributed storage system 120, may provide an object storage service, such as storage service providing enterprise-scale object storage functionality. Further examples of such storage services may include Amazon Simple Storage Service (S3) object storage service, as ActiveScale™, other local and/or cloud-based S3 storage systems/services.

A distributed storage system 120 may be coupled to and/or include an object store 140. The object store 140 comprises one or more data stores for storing data objects. The object store 140 may be implemented across a plurality of physical storage devices. In some example embodiments, the plurality of physical storage devices may be located at disparate locations. Objects stored in the object store 140 may be referenced by metadata entries stored in the metadata store 130. In some example embodiments, multiple copies of a given object or portions thereof (e.g., erasure-encoded copies) can be stored at different physical storage devices to protect against data loss through system failure or to have the object quickly accessible from different geographic locations.

The metadata store 130 may comprise a database that stores an ordered set of metadata entries. Entries may be stored responsive to object storage requests received by a storage service, such as but not limited to, put, get, delete, list, etc. The storage service provided by the storage application 124 may instruct a metadata controller of the metadata store 130 to record the data manipulation operations. For example and not limitation, the storage service provided by the storage application 124 can call corresponding methods of the metadata controller of the metadata store 130 is configured to perform the various storage functions and acts as needed depending on the configuration.

In some embodiments, the metadata store 130 may comprise a horizontally partitioned database having two or more shards, although other suitable database configurations are also possible and contemplated. As horizontal partitioning is a database design principle whereby rows of a database table are held separately, rather than being split into columns (which is what normalization and vertical partitioning do, to differing extents), each partition can form part of a shard, which may in turn be located on a separate database server or physical location. Depending on the configuration, in some implementations, database shards may be implemented on different physical storage devices, as virtual partitions on the same physical storage device, or as any combination thereof.

A metadata store 130 and/or an object store 140 may be included in the distributed storage system 120 or in another computing system and/or storage system distinct from but coupled to or accessible by the distributed storage system 120. The metadata store 130 and/or the object storage 140 include one or more non-transitory computer-readable mediums (e.g., such as those discussed with reference to the memory 316 in FIG. 3) for storing the data. In some implementations, the metadata store 130 and/or the object store 140 may be incorporated with the memory 316 or may be distinct therefrom. In some implementations, metadata store 130 and/or the object store 140 may store data associated with a database management system (DBMS), such as one comprised by and/or controlled by the storage application 124 and/or other components of the system 100 (e.g., node controller 320 in the memory 316). In some instances, the DBMS may store data in multi-dimensional tables comprised of rows and columns, and manipulate, e.g., insert, query, update and/or delete, rows of data using programmatic operations, although other suitable DBMS configurations are also applicable.

In some embodiments, the metadata store may comprise a key-value store, although other suitable variations providing analogous functionality are also possible and contemplated. The key-value store may store metadata (e.g., as key-value pairs) in one or more data stores. The key-value store supports a plurality of storage operations, such as but not limited to, put, get, delete, list, etc., and stores entries representing various data manipulation operations performed on objects, such as standard data manipulation operations (e.g., read, write, delete, modify, etc.). In some embodiments, the key-value store may be sharded or distributed and the technology may include shard identifiers in the key data store to correct for timing differences in storage management processes across shards. In some embodiments, the key-value store may include logs and databases for storing metadata about the lifecycle of objects, as discussed in further detail herein.

In some embodiments, a metadata store 130 may be a key-value store (KVS) that includes a set of key-value pairs correlating with object storage operations. A key-value store is a type of nonrelational database that uses a simple key-value method to store data. A key-value database may store data as a collection of key-value pairs in which a key serves as a unique identifier. Both keys and values can be anything, ranging from simple objects to complex compound objects. Key-value databases are highly partitionable and allow horizontal scaling at scales that other types of databases cannot achieve. In addition, key-value databases generally do not have query languages as in relational DBMS to retrieve data. Instead, key-value databases generally provide simple operations such as get, put, delete, etc. Therefore, key-value databases generally have a high performance, which makes them ideal for the storage of metadata in a large-distributed DSS.

Figure 2A:
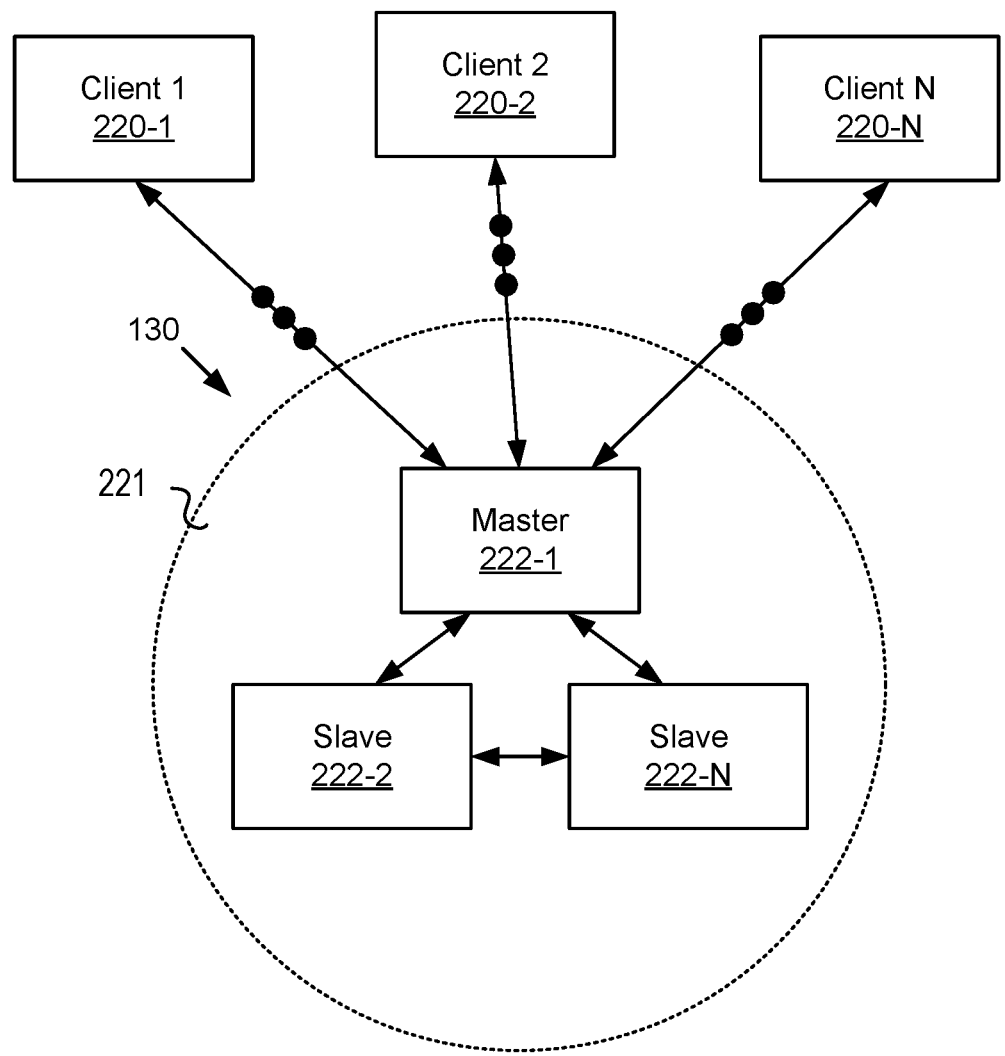
FIG. 2A illustrates a block diagram of an example metadata store of the example data storage system.

In some embodiments, a metadata store 130 may comprise a plurality of nodes (also referred to as a node cluster). The plurality of nodes may, in some cases, include a master node and one or more slave nodes. FIG. 2A illustrates an example metadata store that includes such a node cluster 221. A node cluster 221 may include any suitable number of nodes (e.g., 2, 3, 4, 5, etc., storage nodes, although collections having more than 5 are also contemplated and encompassed hereby). The nodes 222 of the cluster 221 store transaction metadata. In some embodiments, to guarantee consistency/redundancy, it may be desirable for more than half of the nodes to ultimately store the metadata for the same object. For instance, in a key-value embodiment, the effective range of key-value pairs may be synchronized to more than half of the nodes. As illustrated, the node cluster 221 includes a collection of nodes 222, such as 222-1, 222-2, 222-N. It should be understood that the key-value architecture is just one example and that other variations are also possible. For instance, in an embodiment that uses an alternative storage protocol to key-value pairs, such as definition lists, etc., the corresponding set of metadata stored by the alternative protocol may be similarly synchronized between some of the nodes.

As shown, the metadata store designates one of the nodes 222 of the cluster 221 as the leader node (also referred to as the "master") node. The leader node receives and processes the storage operation requests (e.g., such as those received from one or more clients 220-1, 220-2, ..., 220-N). The clients 220 may generate and transmit storage operation requests (e.g., writes) to the distributed storage system (DSS) 120 containing the metadata store 130 and request the DSS 120 perform the storage operations. The requests are received by the metadata store 130 (e.g., via intervening system elements in some embodiments, such as the storage application 124) and then processed in the metadata store 130 in conjunction with the actual object storage operation in the object store 140. In some embodiments, the master node 222-1 in the metadata store 130 places the requests in a queue and processes the requests according to a processing protocol (e.g., sequentially). For example, but not limitation, if there are two sequentially received write requests A and B in the queue, the master node 222-1 processes the write requests A and B sequentially.

In some embodiments, a client 220 may look up which node 222 of the metadata store 130 is the leader node/which node it should communicate with, and then interacts with the leader/master node. In some further embodiments, while not shown, the metadata store 130 and/or the DSS 120 may include a routing component that automatically routes the requests to the current master node 222-1. In a scenario where the master node fails, a new master node can be elected automatically, and clients can failover to the new master node either by re-requesting the identity and/or electronic location (e.g., electronic address, port, etc.) of the new master node, by being routed there by the routing component, or by another suitable method.

A slave node is an active storage node that is not designated as the master node. A slave node can store an instance (e.g., replica) of the data managed by the master node for redundancy. A slave node can be designated to be a master node, and the master node can be designated to be a slave node as needed. For instance, as discussed above, a slave node can be configured to take on the role of a master node responsive to the detection of an anomaly, such as erratic behavior by the master node, the master node becoming non-responsive (due to a network failure, a system crash at the master node, etc.). During the election of a new master node, the metadata store 130 logic may use random selection and/or one or more criteria to determine which slave node should be the new master node. The criteria may include attributes of the node, such as the processing capability of the node, the memory of the node, the age of the node, the geographic location of the node, the performance of the node based on a performance test, the currency of the node (if the node is up-to-date), etc. In some embodiments, the metadata store 130 logic considers whether the metadata stored by the candidate node(s) is fully in sync/current (up-to-date) with the current master node, and if not, may proceed to the next candidate node. In the depicted embodiment of FIG. 2A, a single node 222-1 is designated to be the master node, and the other two nodes 222-2 and 222-N are slaves to the designated master node, although other variations are possible and encompassed hereby.

Referring again to FIG. 1, it should be understood that the system 100 illustrated in FIG. 1 is representative of an example system and that a variety of different system environments and configurations are contemplated and are within the scope of the present disclosure. For instance, in some further embodiments, various functionality may be moved between the server system 128 and the distributed storage system 120, from server system 128 and the distributed storage system 120 to a client, or vice versa, modules may be combined and/or segmented into further components, data may be consolidated into a single data store or further segmented into additional data stores, and some implementations may include additional or fewer computing devices, services, and/or networks, and may implement various functionality client or server-side. Further, various entities of the system 100 may be integrated into a single computing device or system or additional computing devices or systems, etc.

It should be also understood that, while FIG. 1 illustrates two metadata stores 130-1 and 130-N associated with two different distributed storage systems 120-1 and 120-N, in some implementations, the two metadata stores 130-1 and 130-N may be associated with a same distributed storage system 120. In addition, when the capacity of a distributed storage system 120 scales up, more metadata stores 130 may be added and coupled with a single distributed storage system 120. In some embodiments, object storage may, when scaled up, use different name-spaces in object storage, and thus can easily map to different metadata stores.

Figure 2B:
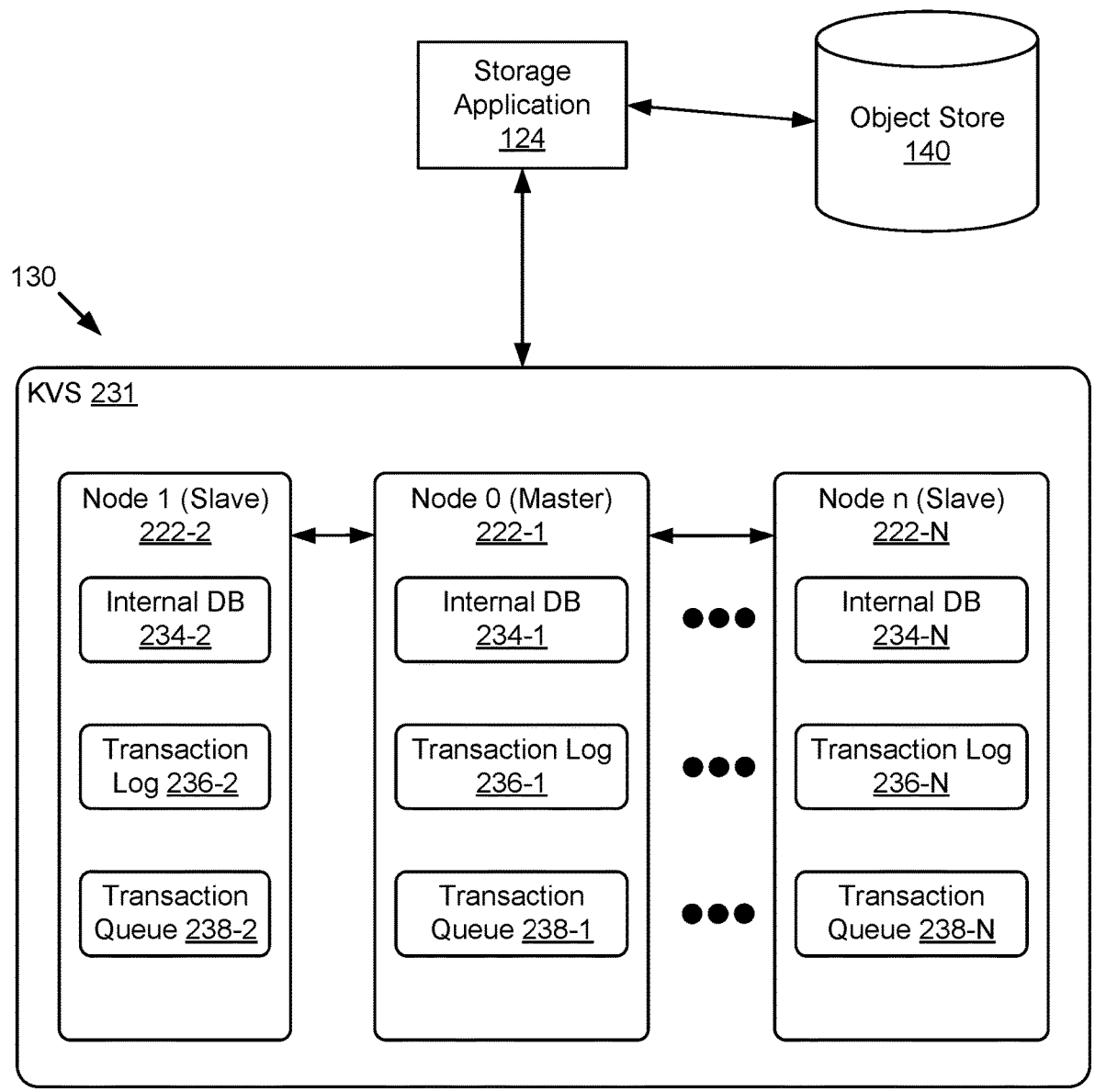
FIG. 2B illustrates a block diagram of various further aspects of the example data storage system.

FIG. 2B depicts a further example aspect of a DSS 120 containing a metadata store 130, a storage application 124, and an associated object store 140. As illustrated, the metadata store 130 may be a key-value store 231 that includes a cluster of nodes for metadata storage. Each node 222 may include an internal database 234, a transaction log 236, and a transaction queue 238. In the example of FIG. 2B, the KVS store 231 comprises at least three storage nodes 222-1, 222-2, and 222-N. However, there may be more than three data storage nodes as indicated by the ellipses between "node 0" 222-1 and "node n" 222-N.

The transaction queues 238-1, 238-2, and 238-N (also referred to herein individually and collectively as transaction queue 238) list storage operation requests received from the clients 102. For instance, each client request received by the master node 222-1 may be first added to the transaction queue 238-1 of the master node 222-1. The master node 222-1 may then send each received storage operation request to a set of one or more slave nodes. The number of slave nodes used in a cluster may be a configured parameter, determined based on the level of redundancy desired, may be fixed, etc. In an enterprise configuration, often multiple (e.g., 3, 5, 7, etc.) slave nodes are used. Each slave node of the set then adds each received request to its respective transaction queue 238. In some embodiments, the client requests in a node 222 are organized in sequential order (e.g., First in First Out), although other ordering schemes may be used and are contemplated.

The transaction logs 236-1, 236-2, and 236-N (also referred to herein individually and collectively as transaction log(s) (TLOG(s)) 236) are ordered logs storing entries/records reflecting the storage operations performed on to objects stored in object store 140 associated with client storage operation requests. When a storage operation request is received (e.g., from a client system 102), transaction information about the storage operation associated with the request is logged in the transaction log 236-1 of the master node 221-1 and one or more transaction logs 236-2 ... 236-N of one or more slave nodes 222-2 ... 222-N.

In some embodiments, the transaction logs 236 contain enough information to undo all changes made to the objects as part of any individual transaction. For instance, the transaction logs 236 record the start of a transaction, all the changes considered to be a part of it, and then the final commit or rollback of the transaction. In other words, the transaction logs 236 comprise the sequence of storage operation requests made to the object store 140 associated with the KVS 231. In some embodiments, the transaction logs 236 in the KVS 231 may provide a failsafe recovery mechanism, as the transaction logs 236 can be replayed in order to determine the most current state of the metadata store 130.

The metadata store 130 interfaces with and is communicatively coupled to the object store 140 through the storage application 124. The object store 140 stores data objects, and the records in the metadata store 130 include a mapping of object identifiers (IDs) to respective object locations in the object store 140.

In some embodiments, the costs of data loss may be advantageously mitigated by only duplicating the transaction log for each client storage operation request across some of the available nodes in the metadata store 130. For instance, when there are three nodes in the metadata store as in the example of FIG. 2B, the transaction log for each client storage operation request may be duplicated to a subset of the nodes, such as node 0 (222-1) and node 1 (222-2), and not node n (222-N). By writing the transaction log for each client request to a subset of the nodes, the number of write operations to the metadata store 130 can be reduced by as much as one third and can thus prolong the life of the local storage in the metadata store 103. Even so, the system is still able to meet the consensus requirement for the majority voting algorithm (e.g., of a Paxos cluster), and thus the consistency of the transaction logs for all client requests in the nodes 222-1, 222-2, and 222-N is guaranteed.

The internal databases 234-1, 234-2, and 234-N store metadata (e.g., key-value pairs) according to the respective client storage operation requests. In a slave node, the entry (e.g., key-value pair(s)) for a client storage operation request may be stored in its internal database 234 after the slave node acknowledges to handle the client request. In a master node, when there are enough acknowledgments received from the slave nodes, the entry may be then pushed to the internal database of the master node 222-1 for storage.

It should be noted, while node 0 (222-1) is labeled as the master node in FIG. 2B, the "master" designation may be temporal (e.g., another node besides node 0 (222-1) may be made the "master"). A master designation is dynamic and can be assigned to/taken over by any other node. In some embodiments, the mater designation is attributed if that node satisfies the requirements to become a master node and the majority of the nodes in the system 100 agree that node to become a master node, as described above, although other designation schemes that are suitable may be utilized.

Figure 3:
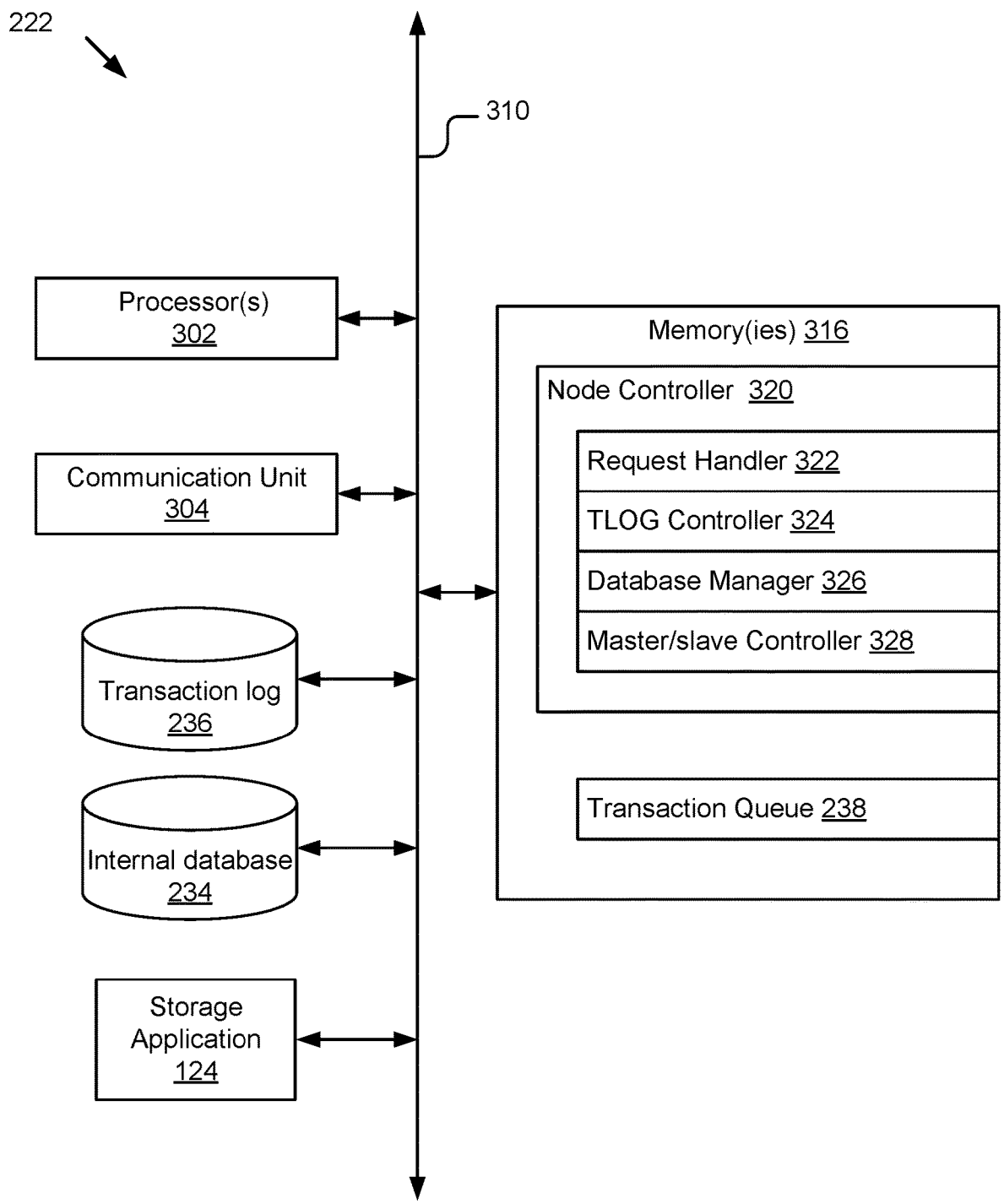
FIG. 3 illustrates a block diagram of an example storage node in the example metadata store.

FIG. 3 is a block diagram of an example storage node 222 in an example metadata store. As illustrated, the node 222 may comprise a computing device or system having processor(s) 302, a communication unit 304, a transaction queue 238, a transaction log 236, an internal database 234, a storage application 124, and memory(ies) 316. As shown, the memory(ies) may store an instance of a node controller 320 and the transaction queue 238, however it should be that the node controller 230 and/or transaction queue 238 may be implemented in a number of ways, such as: as software executable by one or more processors of one or more computer devices; as hardware, such as but not limited to a field-programmable gate array (FPGA), an application-specific integrated circuit (ASIC), etc., and/or a combination of hardware and software, etc.

The processor(s) 302 may execute software instructions (e.g., tasks) by performing various input/output, logical, and/or mathematical operations. The processor(s) 302 may have various computing architectures to process data signals. The processor(s) 302 may be physical and/or virtual, and may include a single core or plurality of processing units and/or cores. The processor 302 may include an arithmetic logic unit, a microprocessor, a general-purpose controller, or some other processor array to perform computations. The processor 302 is coupled to the data bus 310 for communication with the other components of the node 222 and/or the system 100. Although only a single processor is shown in FIG. 3, multiple processors or processing cores may be included.

The communication unit is configured to transmit data to and receive data from other computing devices connected to the network 110 using wireless and/or wired connections. In some embodiments, the communication unit 304 may include one or more wired interfaces and/or wireless transceivers for sending and receiving data. The communication unit 304 may couple to the network 110 and communicate with other nodes 222, servers, clients, system elements, etc. The communication unit 304 may exchange data with other elements of the system using standard communication methods, such as those discussed above. The communication unit 304 is coupled to the bus 310 and enables the other components of the node 222 to communicate and/or interact with other elements of the system 100 that are coupled to the network 110.

The data bus 310 (also simply bus 310) communicatively couples the communication unit 304, the internal database 234, the transaction log 236, the processor(s) 302, the memory(ies) 316, the storage application 124, and/or other components of the node 222. In some embodiments, the bus 310 includes a communication bus for transferring data between components of a computing device or between computing devices, a network bus system including the network 110 or portions thereof, a processor mesh, a combination thereof, etc. In some implementations, the elements of the node 222 and/or the system 100) may cooperate and communicate via a software communication mechanism implemented in association with the bus 310. The software communication mechanism can include and/or facilitate, for example, inter-process communication, local function or procedure calls, remote procedure calls, network-based communication, secure communication, etc.

The memory(ies) 316 include a non-transitory computer-usable (e.g., readable, writeable, etc.) medium, which can be any tangible non-transitory apparatus or device that can contain, store, communicate, propagate or transport instructions, data, computer programs, software, code, routines, etc., for processing by or in connection with the processor(s) 302. For example, the memory(ies) 117 may store the node controller 320 and transaction queue 238 in various implementations. In some implementations, the memory(ies) 316 may include one or more of volatile memory and non-volatile memory. For example, the memory(ies) 316 may include, but is not limited to, one or more of a dynamic random access memory (DRAM) device, a static random access memory (SRAM) device, a discrete memory device (e.g., programmable read-only memory (PROM), field programmable read-only memory (FPROM), read-only memory (ROM)), a hard disk drive, an optical disk drive (e.g., compact disc (CD), digital video disc (DVD), Blue-ray', etc.). It should be understood that the memory(ies) 316 may be a single device or may include multiple types of devices and configurations.

As shown, the node 222 may include an instance of the storage application 124. The instance of the storage application 124 may comprise a stand-alone instance of the storage application 124, application programming interfaces (APIs) and/or drivers (e.g., API packages and/or libraries) configured to interact with a centralized instance of the storage application 124, a node-specific component of the storage application 124 that enables local functionality and/or services, a partial component that includes a portion of the functionality of the storage application 124 relevant to the node 222, a combination of the foregoing, or some other suitable variation. The storage application 124 may comprise a software component that is storable in the memory(ies) 316 and executable by the processor(s) 302 to provide the acts and/or functionality of the storage application 124. In further embodiments, the storage application 124 may be implemented as software, hardware, or a combination of the foregoing, as with the other software components described herein, such as the node controller 320.

The internal database 234 (also simply referred to as the transaction database 234 in some cases) and the transaction log 236 may comprise and/or be stored in any suitable non-transitory computer-readable and writable medium(s). For example, the internal database 234 and/or transaction log 236 may be stored in the same or different memory (e.g., memory(ies) 316, such as random-access memory (RAM), processor cache, a local hard drive (hard disk drive, solid-state drive, etc.), etc. In implementations where responsiveness is an important consideration, a faster memory may be used for some or all of the storage needs. In further examples, the internal database 234 and/or transaction log 236 may be stored on and/or include a dedicated storage device locally coupled to the node 222, a remote data store coupled to the node 222 via the network 110, and/or another data repository.

An instance of a node controller 320 may include a request handler 322, a TLOG controller 324, a database manager 326, and a master/slave controller 328.

The request handler 322 may be executable to handle storage operation requests received from clients 102. For instance, the request handler 322 may queue and unqueue received client requests to/from the transaction queue 238 in the computing device or node 222. In an embodiment where the node 222 is a master node, the request handler 322 may be responsible to receive, relay, and/or respond to client requests. In some cases, the master node may send/relay the received client storage operation requests or aspects thereof to slave node(s). The request handler 322 may also handle other activities related to the client storage operation requests in some embodiments.

The TLOG controller 324 may be executable to manage the transaction log 236 of the node 222. The TLOG controller 324 may store metadata entries in a corresponding transaction log 326 and report completion of such. In some embodiments, the TLOG controller 324 may retrieve a client request from the transaction queue 238, generate a transaction entry for the client request, and save the generated transaction entry to the transaction log 236. In an embodiment where the computing device or node 222 is a slave node, the TLOG controller 324 may also determine whether to process a client request. In a situation where the slave node determines to process the client request, the TLOG controller 324 may further generate an acknowledgment and transmit the generated acknowledgment to the respective master node.

In an embodiment where the computing device or node 222 is a master node, the TLOG controller 324 may determine whether the number of received acknowledgments from the respective slave nodes satisfies the requirement. For example, as discussed elsewhere herein, if the number of received acknowledgments satisfies the requirement, the TLOG controller 324 may store a corresponding transaction entry in the transaction log 236; and if not, the TLOG controller 324 may initiate the sending of a notification to the client 102 that sent the request to inform the client 102 that the request was not satisfied, that there was an error, and/or that the request will be tried, etc.). Responsive to receipt of the notification, the client may then resubmit the request in some cases.

The database manager 326 may be executable to manage the internal database 234. This may include saving metadata to the internal database responsive to a transaction log storage criterion/criteria being met. For example but not limitation, the database manager 326 may push metadata entries (e.g., key-value pairs) to the internal database 234, edit/update existing entries, garbage collect entries, etc. In some cases, this may be in coordination with instructions received from a master node and/or a storage request received from another component of the system 100.

The master/slave controller 328 may be executable to determine whether to designate a node in a cluster 221 a master node or a slave node, select a new master node from the slave nodes, etc., as discussed earlier with reference to FIG. 2A.

It should be noted that the illustrated components in the node controller 320 are provided by way of example, and that one or more of the constituent components 322, 324, 326, and/or 328 of the node 222 and/or the instance of the storage application 124 could be consolidated into fewer components and/or divided into additional components without departing from the scope of this disclosure.

Figure 4:
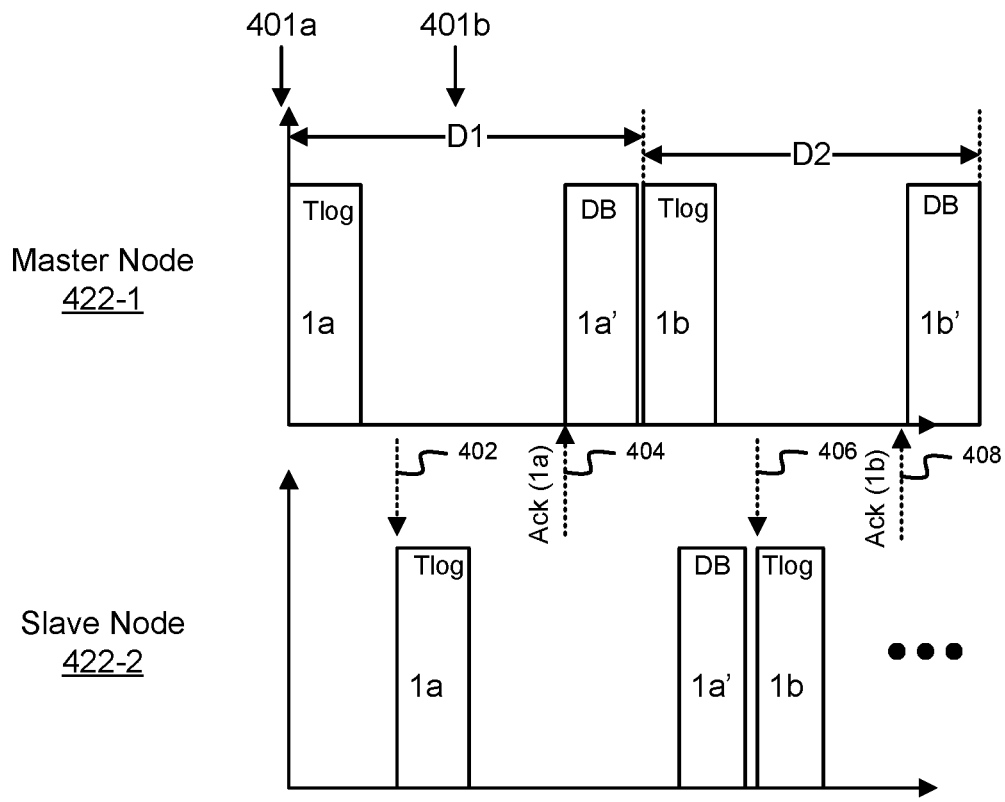
FIG. 4 illustrates a diagram of a process for processing metadata storage operations according to an unimproved approach.

FIG. 4 illustrates a diagram of a process for processing data storage operations according to an unimproved approach. As shown, to fully process a storage operation request 401$a$ associated with a given data object, the master node 222-1 must send 402 a request 402 to the slave node(s) in the cluster, such as slave node 222-2, and wait for an acknowledgement that the transaction was successfully recorded in their logs.

More particularly, for storage operation request 401$a$, the master node writes an entry "1$a$" to the transaction log 236-1 of a master node 422-1, and responsive to doing so sends a request to the slave node 422-2 instructing the slave node 422-2 to do the same. Responsive to receiving the request 402, the slave node 222-2 writes a corresponding entry 1$a$ in its own transaction log. After successfully storing the entry 1$a$, the slave node 222-2 generates and sends a response 404 acknowledging that entry 1$a$ was successfully stored in the transaction log of the slave node 422-2.

Before being able to store a corresponding entry in the transaction database of the node 422-1, or process a subsequent storage operation request 401$b$ for the same or different data object, the master node 422-1 has to wait for at least a portion of the slave nodes that are involved, such as node 422-2, to acknowledge that a corresponding entry was written to their own transaction logs. This introduces latency from the time required for the slave nodes to process the entries and acknowledge the successful completion thereof.

In this case, responsive to receiving the response 404 from the slave node 422-2 acknowledging the storage of the corresponding entry 1$a$, the master node 422-1 writes the corresponding entry 1$a'$ to the transaction database of the master node 422-1, and once successfully completed, can proceed to process the next storage operation request, which in this case is 401$b$, by writing entry 1$b$ in the transaction log of the master node 422-1 and requesting 406 that the slave node 422-2 do the same, in response to which the slave node 422-2 stores a corresponding entry 1$b$ in its transaction log, sends an acknowledgment 408 of such to the master node 422-1, which then stores the corresponding entry 1b' in the transaction database, and so on and so forth.

In some cases, the slave node 422-2, when it receives the request 406 but before proceeding to execute it, also verifies that (and waits for) the data associated with the previous request 402 has been written to the internal database of the slave node 422-2. However, doing so usually adds latency and limits the number of requests that can be processed by the cluster during a given period of time.

One disadvantage of the unimproved approach depicted in FIG. 4 is that, when there are two storage requests (e.g., write requests) 401a and 401b in the queue, the master node cannot start to proceed the second request 401b until the master node writes the metadata entry 1a' for the request 401a to the internal database of the master node. This creates a waiting/delay period D1, during which the master node cannot proceed to process any further storage requests (e.g., 401b). Similarly, slave node 422-2 may not process further storage requests during the waiting/delay period D2. These waiting periods D1 and D2 limit the storage performance of the metadata store and correspondingly the object store, and thereby limit the scalability of the storage system, frustrate clients with slow/unacceptable response times, increase costs, and/or ultimately render the metadata store unusable.

In contrast, FIGS. 5A-5D illustrate diagrams of improved processes for processing data storage operations in a data storage system, which advantageously reduce latency and increase throughput. In these processes, instead of having to wait for a requisite number of transaction log acknowledgments from slave nodes for a storage operation request before proceeding to process a subsequent storage request, a master node may uniquely start processing the subsequent request(s) in parallel with the slave node processing of prior requests.

Figure 5A:
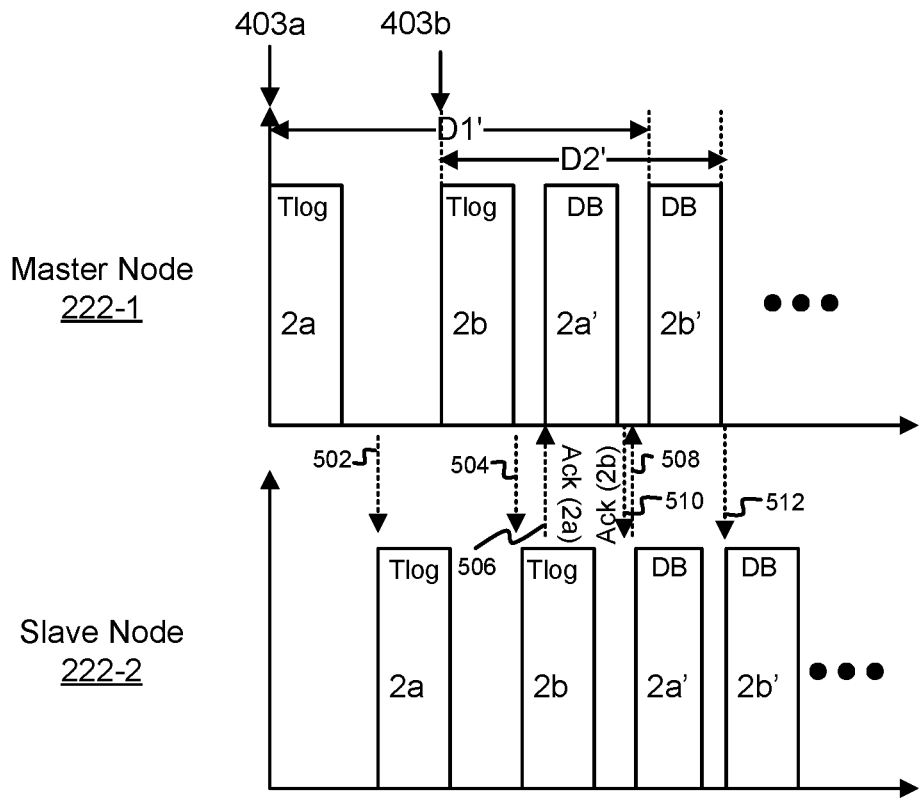
FIGS. 5A-5D illustrate diagrams of improved processes for processing metadata storage operations in a data storage system.

More particularly, FIG. 5A depicts an improved method for processing storage operation requests using a master node 222-1 and slave node 222-2, although it should be understood that more slave nodes 222 may, and are often, used. As shown, two storage operation requests (e.g., write requests) 403a and 403b are sequentially received and queued in a master node. Upon receiving request 403a, the master node 222-1 may write a transaction entry 2a for the request 403a in the transaction log of the master node 222-1. The master node 222-1 also distributes the request 403a to a set of slave nodes. A request to a slave node 222 may be relayed, distributed, etc., after a related entry has been stored in the transaction log of the master node, at the same time that the entry is being stored in the transaction log of the master node, at the same time that or otherwise in association with the determination to store the entry in the transaction log of the master node is made, etc. Accordingly, in the depicted embodiment, the master node 222-1 relays 502 the request 403a to slave node 222-2.

In some embodiments, during the process of writing the entry 2a in the transaction log of the master node 222-1, the master node 222-1 may receive the subsequent write request 403b and write it to the transaction queue. Responsive to having received and queued the request 403b, the master node 222-1 may advantageously proceed to begin processing the storage operation request 403b without having to wait for the acknowledgment(s) from the slave node(s) that are storing corresponding 2a entries, such as slave node 222-2.

Stated another way, prior to receiving acknowledgement 506, the master node 222-1 may proceed to store the entry 2b, which corresponds to request 403b, in its transaction log and request a set of slave nodes 222 (e.g., slave node 222-2) do the same by storing a corresponding entry 2b in its/their transaction log(s). Responsive to writing entries 2a and 2b, the slave node 222-2 may send respective the acknowledgments associated with the requests 403a and 403b back to the master node 222-1 as shown by arrows 506 and 508. For instance, the acknowledgment for entry 2a may be sent after entry 2a is stored in the transaction log of the slave node 222-2, and the acknowledgment for entry 2b may be sent after entry 2b is stored in the transaction log of the slave node 222-2.

Based on the acknowledgments received from the slave nodes (e.g., 222-2 . . . 222-N) for a given request, the master node 222-1 determines whether to proceed to write a corresponding entry (e.g., 2a') in the internal/transaction database. In the depicted embodiment, for instance, the master node 222-1 sequentially proceeds to write entry 2a' in the transaction database responsive to receiving the acknowledgment 506, and proceeds to write entry 2b' in transaction database responsive to receiving the acknowledgment 508, and so forth.

In some embodiments, the master node 222-1 evaluates whether a satisfactory number of acknowledgment responses have been received from slave nodes (e.g., 222-2 and others (not depicted)). For instance, a minimum threshold may be defined that requires that a minimum number of acknowledgments be received indicating the successful storage of corresponding entries (e.g., 2a) in the transaction logs of the slave nodes of the set to which the request was sent. The master node 222-1 counts the number of responses received from those slave nodes indicating the successful storage of the transaction log entry and proceeds to store the corresponding entry in the transaction database once the minimum threshold is satisfied.

As a further example, for the request 403a, the threshold may equal half plus 1 of the slave nodes to which the request was sent by the master node, and when the master node 222-1 receives the acknowledgments from half of the slave nodes (e.g., 2 of 4, 3 of 5, etc.) plus one (including the master node itself), the master node 222-1 may proceed to push the entry 1a (e.g., a given key-value pair) to the internal transaction database (e.g., 234-1), which may store metadata associated with the storage operation of the request 403a (e.g., stores metadata about a write request including a timestamp, a unique identifier of the object, a status, a client identifier, etc.). In a further example where the storage operation is a write request, in a five node setup (e.g., four slave nodes and one master node), the threshold may be two, and once the master node receives acknowledgments from at least one of the four slave nodes, it may proceed to writes the data associated with the write request to the internal database 234 in the master node.

The slave node also stores entries 2a' and 2b' that correspond to entries 2a and 2b in the internal database of the slave node 222-2. In some embodiments, this may be done in response to receiving subsequent confirmations 510 and 512 (e.g., signals confirming such sent from the master node 222-1 to the slave node 222-2 and processed thereby) from the master node 222-1 that the entries 2a' and 2b' were successfully stored in the internal database of the master node 222-1. In further embodiments, the slave node 222-2 may proceed to write the entries 2a' and 2b' in the internal database of the slave node 222-2 independently of the master node 222-1, and as a result, entries 2a' and 2b' could be stored earlier than depicted.

Beneficially, one can see when comparing FIGS. 4 and 5A, and D2' relative to D2 in particular, that the transaction period for requests subsequent to the first request (e.g., 403b, etc.) according to the improved approach in FIG. 5A is substantially shorter for both the master node 222-1 and the slave node 222-2 relative the unimproved approach in FIG. 4. Additionally, requests can be processed in parallel under the improved approach whereas they cannot in the unimproved approach. These benefits provide for significantly improved processing times, better scalability, and throughput.

Figure 5B:
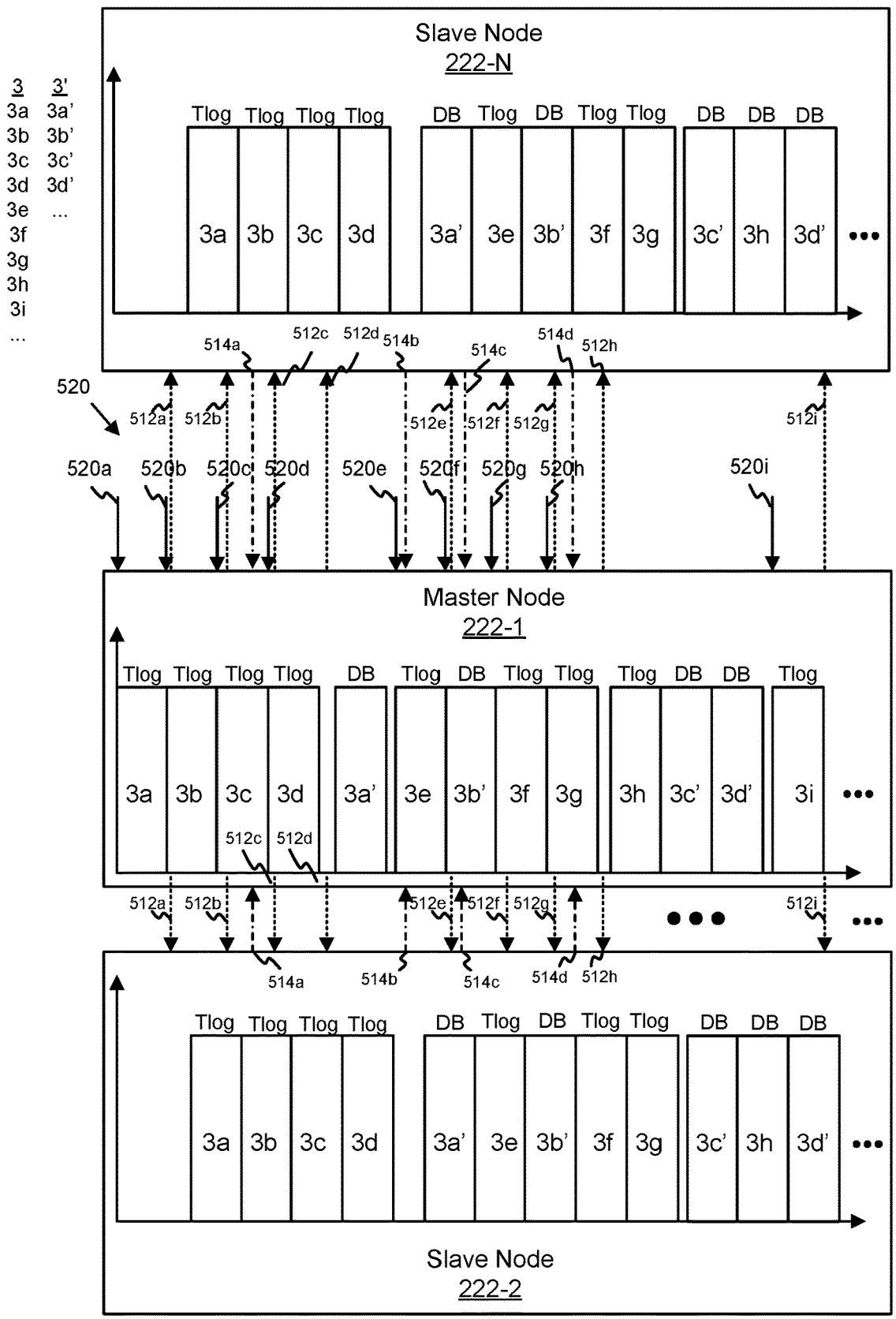

FIG. 5B illustrates an example involving a multiplicity of serial storage operation requests 520 (e.g., 520a, 520b, 520c, 520d, 520e, 520f, 520g, 520h, 520i, etc.). As shown, the master node 222-1 can begin to process the requests 520 responsive to receiving them as opposed to having to wait (as in unimproved approaches). In particular, the master node 222-1 proceeds to successively write corresponding log entries 3 (3a, 3b, 3c, 3d, 3e, 3f, 3g, 3h, 3i, etc.) in the transaction log. For instance, responsive to receiving requests 520a, 520b, 520c, and 520d the master node 222-1 writes log entries 3a, 3b, 3c, and 3d in its transaction log and sends corresponding requests 512a, 512b, 512c, and 512d to slave node(s) (e.g., slave node 222-2) requesting the slave node(s) do the same. As shown, in response to receiving the requests 512a, 512b, 512c, and 512d, the slave nodes 222-2 and 222-N write log entries 3a, 3b, 3c, and 3d to their respective transaction logs, and in association with doing so, send responses 514a, 514b, 514c, and 514d acknowledging that the log entries 3a, 3b, 3c, and 3d were successfully stored to the master node 222-1.

Responsive to receiving responses 514a from slave nodes 222-2 and 222-N, the master node 222-1 proceeds to store a corresponding entry 3a' in its transaction database. Similarly, responsive to receiving responses 514b, 514c, and 514d from slave nodes 222-2 and 222-N the master node 221-1 (e.g., based on one or more storage criteria (e.g., a threshold, response count, etc.)), respectively proceeds to store corresponding entries 3b', 3c', 3d', etc., in its internal database. The slave nodes 222-2 . . . 222-N also store corresponding entries 3a', 3b', 3c', and 3d' in their respective internal databases, as discussed elsewhere herein.

The same processing is performed for subsequent requests 520e, 520f, 520g, 520h, 520i, etc., such that transaction log entries 3e, 3f, 3g, 3h, and 3i, etc., are written to the transaction log of the master node 222-1, requests 520e, 520f, 520g, 520h, and 520i, etc., are sent to the slave nodes 222-2 . . . 222-N, which processes those requests and also stores transaction log entries 3e, 3f, 3g, 3h, and 3i, etc., and corresponding database entries.

It should be understood that while FIG. 5B shows the master node 222-1 and slave nodes 222-2 and 222-N performing one operation at a time, each node may be capable of executing multiple threads in parallel to process routines that are ready to be executed at the same time (e.g., multiple transaction log and/or database writes at the same time, etc.).

Figure 5C:
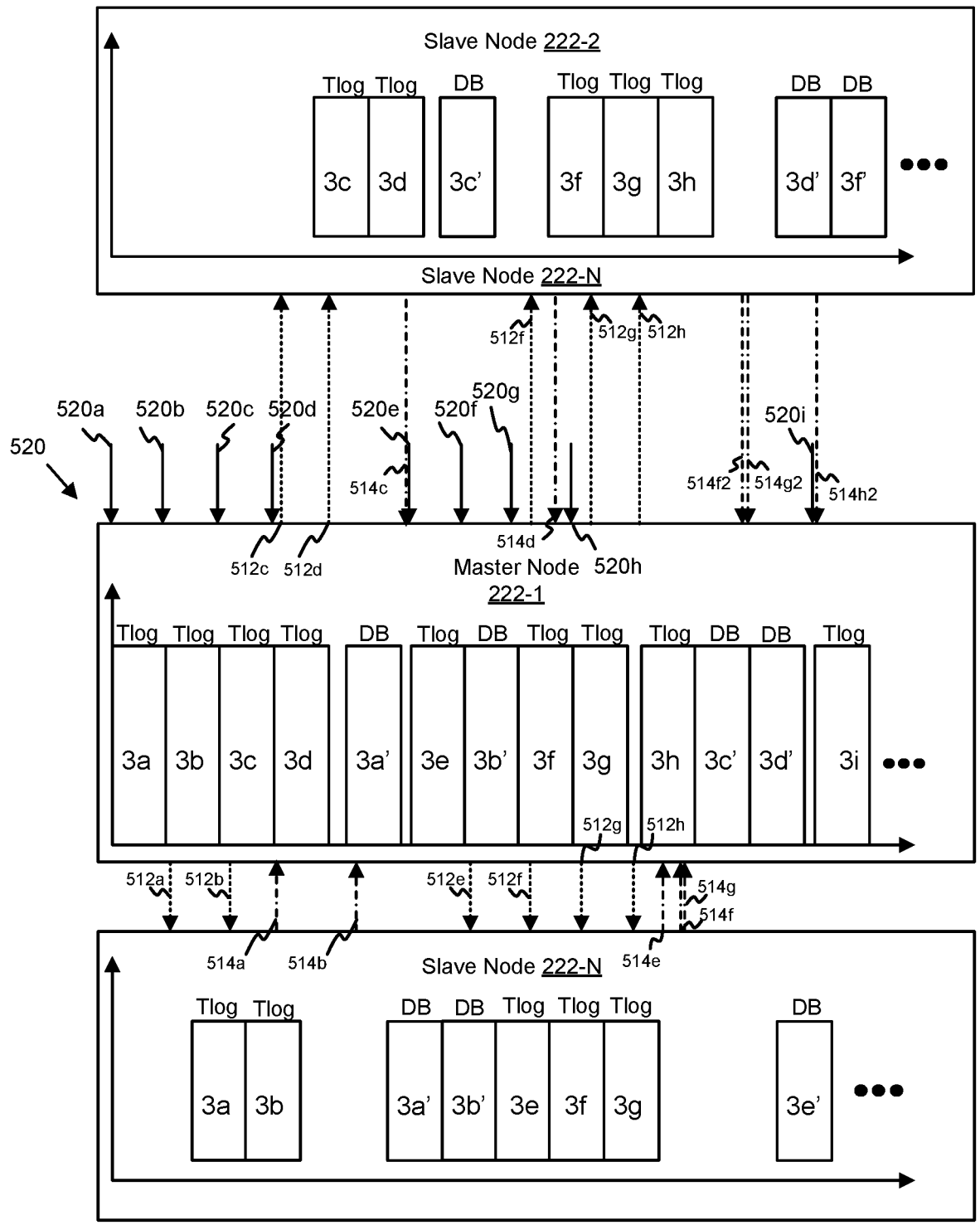

FIG. 5C illustrates an example involving the multiplicity of serial storage operation requests 520 (e.g., 520a, 520b, 520c, 520d, 520e, 520f, 520g, 520h, 520i, etc.), where the requests are distributed to different slave nodes 222-2 . . . 222-N. As shown, requests 520a, 520b, 520e, 520f, and 520g are relayed to slave node 222-N for processing as reflected by 512a, 512b, 512e, 512f, and 512g, and requests 520c, 520d, 520f, 520g, and 520h are relayed to slave node 222-2 for processing as reflected by 512c, 512d, 512f, 512g, and 512h, although it should be understood in other implementations additional slave nodes may and are often used to provide for redundancy, etc., and so a higher minimum slave node acknowledgment threshold may be met so that the master node 222-1 may store the corresponding entries in its transaction database, as discussed elsewhere herein.

As shown, the transaction log entries 3a, 3b, 3c, 3d, 3e, 3f, 3g, 3h, 3i, etc., and the database entries 3a', 3b', 3c', 3d', 3e', 3f, 3g', 3h', 3i', etc., are processed by the master node 222-1 and the respective slave nodes assigned to process them in the same manner as that discussed with respect to at least FIG. 5B, as reflected by the use of the same reference numbers, so that description applies and some repetitive aspects will not be repeated here for the purposes of brevity. As further shown, a subset of transaction log entries 3c, 3d, 3f, 3g, 3h, etc., and corresponding database entries 3c', 3d', 3f, etc., are processed by slave node 222-2, and another subset of transaction log entries 3a, 3b, 3e, 3f, 3g, etc., and corresponding database entries 3c', 3d', 3e', etc., are processed by slave node 222-2. In some cases, different slave nodes may process distinct subsets of requests and thus entries, and in other cases, the subsets that are processed may be mixed as in this example (e.g., requests 520f and 520g were routed to both slave nodes 222-2 and 222-N, while the other requests were not). Other variations also apply.

On occasion, there might be an anomaly that occurs that can affect the normal processing of the storage operations by the metadata store 130, as discussed above. As a result, the storage operations (e.g., write requests) being processed become vulnerable. That is, more than one request may affect and be caused to fail because multiple requests can be processed in parallel by the metadata store 130.

Figure 5D:
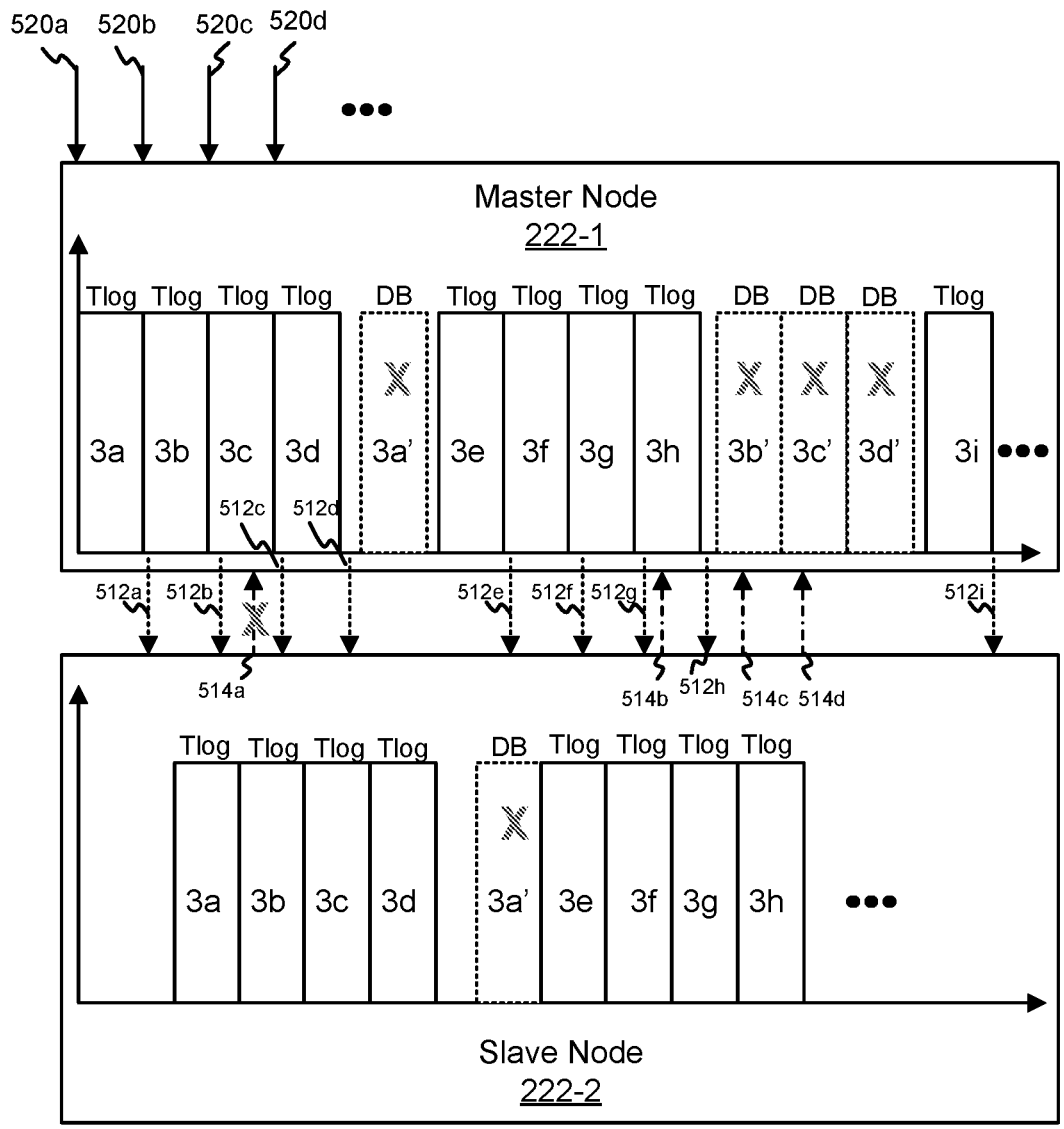

FIG. 5D illustrates such a scenario and how it can be elegantly handled by the DSS 120. As in FIG. 5B, a multiplicity of serial storage operation requests (e.g., 520a, 520b, 520c, 520d, etc.) may be received and the master node 222-1 and slave nodes (e.g., 222-2 may proceed to attempt to write corresponding log entries (3a, 3b, 3c, 3d, 3e, 3f, 3g, 3h, 3i, etc.) in their transaction log and corresponding database entries (3a', 3b', 3c', 3d', etc.) in their transaction databases based on the requests (512a, 512b, 512c, 512d, 512e, 512f, 512g, 512h, 512i, etc.) and responses (514a, 514b, 514c, 514d, etc.) sent between the master and slave nodes as discussed elsewhere herein.

More particularly, in the scenario depicted in FIG. 5D, responsive to receiving requests 520a, 520b, 520c, and 520d the master node 222-1 writes log entries 3a, 3b, 3c, and 3d in its transaction log and sends corresponding requests 512a, 512b, 512c, and 512d to slave node(s) (e.g., slave node 222-2) requesting the slave node(s) do the same. As shown, in response to receiving the requests 512a, 512b, 512c, and 512d, the slave nodes 222-2 and 222-N write log entries 3a, 3b, 3c, and 3d to their respective transaction logs, and in association with doing so, attempt to the send responses 514a, 514b, 514c, and 514d to the master node 222-1 acknowledging that the log entries 3a, 3b, 3c, and 3d were successfully stored.

The transaction queue of the master node 222-1 includes 13 expected transaction log and database operations to be processed by the master node 222-1 if it functions properly. However, due to the anomaly (e.g., system crash, network failure, power outage, etc.), acknowledgment 514a from the slave node for request 520a/512a may fail to be transmitted to the master node 222-1, as shown by the Xs in the figure. This causes the master node 222-1 to fail to process the database (DB). For example, the master node 222-1 may fail to write the metadata entry 3a' to its internal database. In the depicted embodiment, processing of the request 520a may be suspended or terminated by the master node 222-1 depending on the use case, as discussed elsewhere herein. In some embodiments, the set slave nodes requested to also process the request, such as slave node 222-2, may also suspend or terminate processing, as shown in FIG. 5D. In further embodiments, the slave node 222-2 may proceed to write the metadata entry 3*a*' to its internal database for redundancy (so that the master node 222-1 may retry to write its own entry (e.g., responsive to a successful transmission of the acknowledgment in this scenario)) or as a byproduct, in which case the slave node 222-2 may ignore the entry or delete/garbage collect it.

In the depicted example, responsive to detecting the failure associated with request 520*a*, processing for other requests has already started. For instance, entries for requests 520*b*, 520*c*, and 520*d* have already been written into the transaction log of the master node 222-1 and/or the respective slave node 222-2. In the case that data associated with these requests may be related to request 520*a*, for consistency, the remaining operations for these write requests may be canceled, terminated, and/or considered as invalid as shown as reflected by the Xs in the figure. In some embodiments, a failure may be a system failure that causes all the write requests in progress to fail at certain stages of processing. At this point, the already-processed operations for these write requests may be considered invalid and incoming operations for these requests may be automatically terminated or canceled.

As discussed elsewhere herein, after canceling, terminating, or invalidating these transaction log and database write operations, the master node 222-1 may generate a message for each request, to notify the respective client of the failure of processing each request. In some embodiments, the message may also include an instruction to direct the respective client to resubmit the corresponding write request. Alternatively, if these write requests are cached in the storage nodes, these write requests may be retrieved from the cache and re-processed again if the storage nodes return to normal operation. Other variations also apply.

For convenience, FIGS. 5A-5D illustrate different application scenarios for the disclosed technology. However, it should be noted that the examples provided in these figures are merely for illustrative purposes but not to be constructed as limitations to the applications of the technology. In various applications of the technology, the nature of the metadata store 130, the number of nodes 222 in a cluster, the configuration of each storage node 222, and other aspects may vary.

Figure 6:
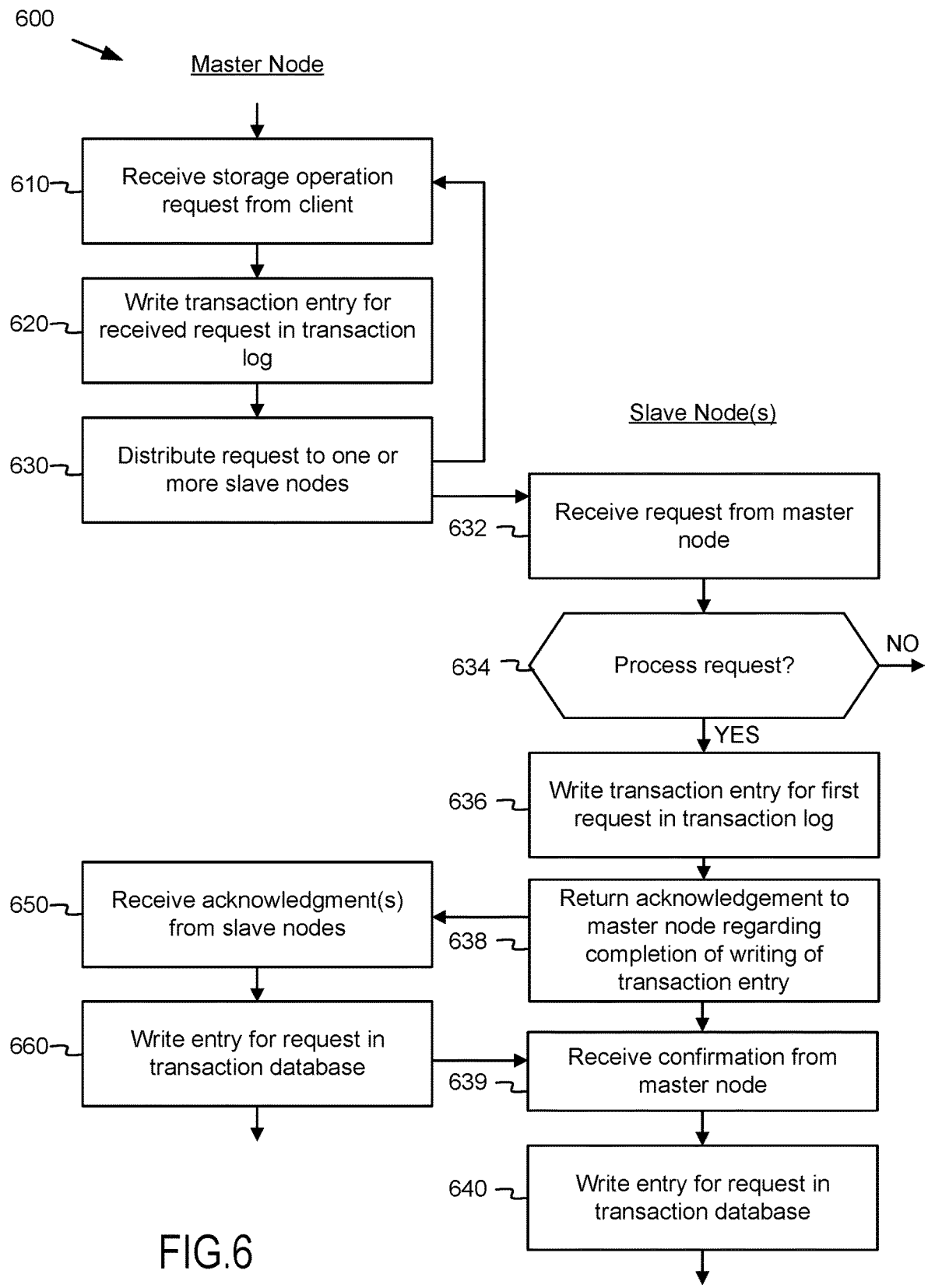
FIG. 6 illustrates an example method for processing metadata storage operations at a master node and one or more slave nodes.
Figure 7:
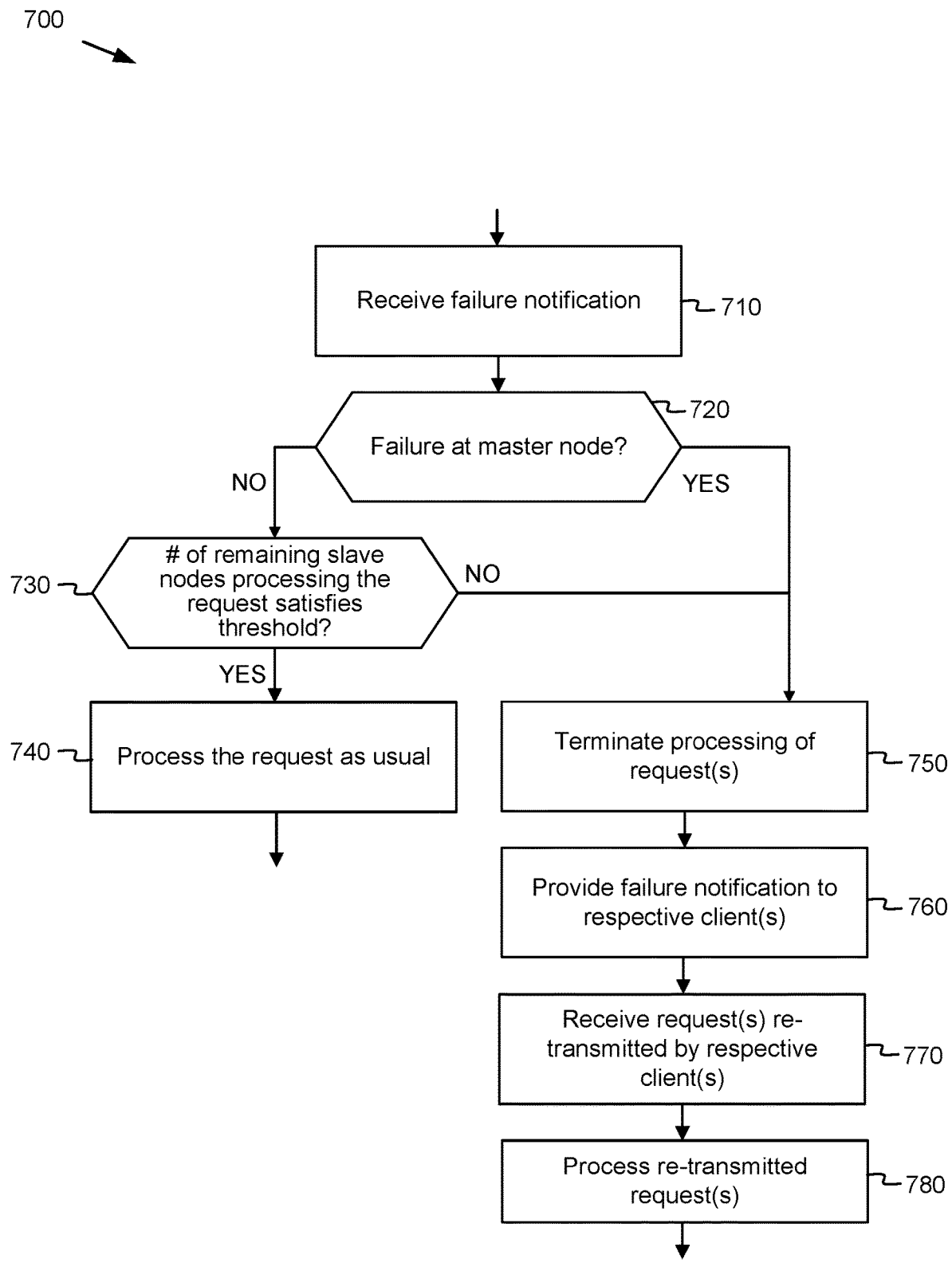
FIG. 7 illustrates an example failure recovery method.

FIGS. 6 and 7 provide additional and/or alternative embodiments, features, and/or details for the subject matter discussed with respect to at least FIGS. 5A-5D. In particular, FIG. 6 illustrates a flowchart of a method of processing transaction log and database write operations in master and slave nodes.

At block 610, the master node 222-1 receives a storage operation request from a client 102-N (e.g., a write request to write data into the object store 140). For instance, the request may request a data object to be stored in the object store 140. In some embodiments, the client 102-N may identify the master node in the metadata store 130. The client may then directly communicate with the master node 222-1 to submit the write request. In other embodiments, an intervening interface may route the request to the node designated as the master node. Other variations may apply as discussed elsewhere herein.

As requests are received, they may be entered in the transaction queue 238-1 of the master node 222-1. In some embodiments, the requests are placed into the queue in sequential order, although other sequencing protocols may be used. For example but not limitation, when determining which request to process next, the master node 222-1 may retrieve the next request entry from the transaction queue 238-1, or in cases where a given request takes priority, the master node 222-1 may process that request out of sequence. A queue entry may include some or all of the information from the request to which it corresponds and/or other information related to the processing of the request. In some cases, the node may assign a unique identifier to each request in the queue and include it in the queue entry. For instance, the identifier for a request may include the time of receiving the request by the master node 222-1, and may also include the name and some other metadata information for the file or data object associated with the request.

At block 620, the master node 222-1 writes a transaction entry for the received write request into the transaction log 236-1 of the master node and at block 630, the master node 222-1 sends a corresponding request to a set of one or more slave nodes 222-2 to 222-N in the metadata store 130. Accordingly, each slave node of the set receives the request and determines whether to process the write request or not. If a slave node determines to process the request, the slave node will save the request to its own transaction log and return an acknowledgment to the master node 222-1 thereafter. Further details about the processing of the instant request by a slave node may refer to the following description for blocks 632-640. When there are enough acknowledgments received from the slave nodes by the master node 222-1, the master node may determine to write the metadata for the request to the internal database 234-1, as further described in blocks 650-660.

While sending the request, the master node 222-1 may receive additional storage operation requests the method may return to block 610 to process those requests (e.g., log them in the queue, store them, distribute them to slave nodes).

During the period of time between the receipt of the request in block 610 and the receipt of the requisite number of acknowledgment(s) in block 650, the master node 222-1 advantageously proceeds to process other requests in the transaction queue, as discussed elsewhere herein. These requests may be received by the master node after the instant request was received (e.g., before or during the above-described processing of the instant request by the master node, prior to receiving the requisite number of acknowledgments, etc.). The master node 222-1 may proceed to process the requests by repeating the above blocks 620 and 630 for each request.

It should be understood that the master node 222-1 may proceed with the operations of block 630 prior or in parallel with blocks 610 and/or 620. For example, in some embodiments, the master node 222-1 may first distribute request(s) to the slave node(s) before or while writing a transaction entry for the request to the transaction log 236-1 so that that a request can be distributed to all the slave nodes earlier in the process and thus potentially save additional time.

At block 632, each slave node 222-N of the set may receive the request from the master node 222-1. Similar to the master node 222-1, the slave node 222-N may have a transaction queue 238-N and, upon receipt of the request, may log it in the transaction queue 238-N in the same or similar manner as the master node 222-1.

At block 634, the slave node 222-N determines whether to process the request. As discussed elsewhere herein, there might be different reasons that cause the slave node 222-N not to proceed with the request. If the slave node 222-N determines not to process the request, the slave node 222-N may remove the request from the transaction queue 238-N without taking additional actions regarding the request.

However, if the slave node 222-N determines to process the request, at block 636, the slave node 222-N proceeds to write a transaction entry for the request in the transaction log 236-N. Responsive to writing the request as a transaction entry in the transaction log 235-N of the slave node, the slave node 222-N generates an acknowledgment to notify the master node 222-1 regarding the completion of the writing of the transaction entry to the transaction log of the slave node 222-N.

At block 638, the slave node 222-N sends the acknowledgment to the master node 222-1. The acknowledgment may be transmitted to the master node over the network, a bus, or any other suitable communication medium depending on the architecture.

At block 650, the master node 222-1 may receive acknowledgment(s) from the respective slave node(s) of the set to which the request was sent in block 630. As discussed elsewhere herein, the master node 222-1 may count the number of the received acknowledgments to determine whether the is a sufficient number of acknowledgments received from the slave nodes to proceed to store the corresponding metadata entry in its internal database 234-1.

At block 660, the master node 222-1 writes the metadata entry for the request in the internal database 234-1. Responsive to storing the corresponding entry, the master node 222-1 may determine the processing of the request to be complete. In some embodiments, upon completion, the master node 222-1 may flag the request as complete and confirmation of such may be transmitted to the requester (e.g., client 102).

At block 639, the slave node 222-N may receive a confirmation/acknowledgment from the master node 222-1 indicating that the master node 222-1 successfully stored the corresponding entry in its internal database. The acknowledgment may be transmitted to the master node over the network, a bus, or any other suitable communication medium depending on the architecture.

At block 640, the slave node 222-N finishes processing the request by storing its own corresponding entry (e.g., the metadata for the request) to its internal database 234-N. In some embodiments, this may be responsive to receiving a request from the master node 222-1 including a confirmation that the master node 222-1 stored an instance of the corresponding entry in its internal database and/or a request that the slave node 222-N do the same. In some further embodiments (e.g., such as embodiments requiring less consistency), the slave node 222-N may proceed to store its corresponding entry without requiring confirmation. Responsive to the successful completion of the storing of the metadata entry in the internal database 234-N, the slave node 222-N may determine that the processing of the request is complete.

As discussed elsewhere herein, on occasion, the processing of one or more requests may fail due to different reasons (e.g., the system failure). FIG. 7 illustrates an example method for executing the timing scheme for the transaction log and database write in a failure mode.

At block 710, a failure that affects the processing of one or more requests may be detected. The master node 222-1 may be notified if the detected failure happens to be in a slave node.

At block 720, it may be determined whether the detected failure occurred in the master node or in a slave node.

At block 730, if the detected failure happens to be in a slave node, it may be then determined whether there are enough remaining slave nodes that have sent (or are expected to send) acknowledgments to the master node 222-1 to still proceed.

At block 740, if there are still enough remaining slave nodes, the master node 222-1 and these remaining slave nodes may continue to process the affected request without interruption.

However, if there are not enough remaining slave nodes, or if the detected failure happens to be in the master node, at block 730, some or all outstanding requests that are in progress, including the processing of these outstanding requests in the slave node(s), may be retried, suspended, or cancelled. In some cases, even if these outstanding requests continue to be processed in the master node and/or slave nodes, the processing of these requests may be considered as invalid, and thus may be reversed if possible. As discussed elsewhere herein, if a master node fails, another slave node may be selected as a new master node, which then takes the responsibility to finish the aforementioned tasks and other normal functions of the master node. For instance, the new master node may invalidate the operations processed for the affected requests, resume those operations, etc.

At block 760, a failure notification may be sent by the master node (previous or new master node) to the respective clients that have submitted the affected outstanding requests. The notification may notify each client that the respective request failed to be processed as expected. The notification may, in some cases, include an instruction to direct the client to retransmit the corresponding request to the master node 222-1. Other variations also apply.

At block 770, the master node 222-1 may receive the requests re-transmitted by the respective clients.

At block 780, the master node and the slave nodes may process these re-transmitted requests. In this way, outstanding requests that are affected by the detected failure may be re-processed, thereby ensuring the consistency of the disclosed system in processing the requests from the clients.

Methods and systems for the timing scheme for processing transaction log and database write operations in a storage node cluster are described above. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware.

Reference in the specification to "one embodiment" or "one embodiment" means that a particular feature, structure, or characteristic described in connection with the embodiment is included in at least one embodiment or implementation of the disclosed technologies. The appearances of the phrase "in one embodiment" in various places in the specification are not necessarily all referring to the same embodiment or implementation.

Some portions of the detailed descriptions above may be presented in terms of processes and symbolic representations of operations on data bits within a computer memory. A process can generally be considered a self-consistent sequence of operations leading to a result. The operations may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, for example, but is not limited to, any type of disk including floppy disks, optical disks, CD ROMs, and magnetic disks, read-only memories (ROMs), random access memories (RAMs), erasable programmable read-only memories (EPROMs), electrically erasable programmable read-only memories (EEPROMs), magnetic or optical cards, flash memories including USB keys with non-volatile memory or any type of media suitable for storing electronic instructions, each coupled to a computer system bus.

The disclosed technologies can take the form of a hardware implementation, a software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The terms storage media, storage device, and data blocks are used interchangeably throughout the present disclosure to refer to the physical media upon which the data is stored.

Finally, the processes and displays presented herein may not be inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies, and other aspects are not mandatory or significant, and the mechanisms that implement the present techniques and technologies or its features may have different names, divisions and/or formats. Furthermore, the modules, routines, features, attributes, methodologies, and other aspects of the present technology can be implemented as software, hardware, firmware, or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A computer-implemented method, comprising:
    writing a first transaction entry in a transaction log of a first node based on a first request for a first operation associated with a first storage object;
    requesting that a second node writes the first transaction entry in a transaction log of the second node based on the first request;
    while awaiting a first acknowledgment of a completion of a writing of the first transaction entry in the transaction log of the second node, writing one or more subsequent transaction entries in the transaction log of the first node based on one or more subsequent requests for one or more operations associated with one or more storage objects;
    determining a failure to write a certain entry from the one or more subsequent transaction entries in one of the transaction log of the first node and the transaction log of the second node;

responsive to determining the failure, terminating a processing of a certain request from the one or more subsequent requests that is associated with the certain entry; and
providing a failure notification to a client that submitted the certain request associated with the certain entry.

2. The computer-implemented method of claim 1, further comprising, responsive to receiving the first acknowledgment of the completion of the writing of the first transaction entry in the transaction log of the second node, writing a first metadata associated with the first request in a transaction database of the first node.

3. The computer-implemented method of claim 2, further comprising receiving the one or more subsequent requests after writing the first metadata associated with the first request in the transaction database of the first node, wherein:
receiving the one or more subsequent requests includes receiving a subsequent request for an operation associated with a second storage object;
writing the one or more subsequent transaction entries includes writing a subsequent transaction entry in the transaction log of the first node based on the subsequent request; and
the computer-implemented method further comprises requesting that the second node writes the subsequent transaction entry in the transaction log of the second node based on the subsequent request, wherein:
the subsequent transaction entry is written in the transaction log of the first node after the first metadata associated with the first request is written in the transaction database of the first node; and
the subsequent transaction entry is written in the transaction log of the second node after the first metadata associated with the first request is written in a transaction database of the second node.

4. The computer-implemented method of claim 2, further comprising:
requesting that the second node writes a second transaction entry in the transaction log of the second node based on a second request included in the one or more subsequent requests;
receiving a second acknowledgment of a completion of the writing of the second transaction entry in the transaction log of the second node; and
writing a second metadata associated with the second request in the transaction database of the first node.

5. The computer-implemented method of claim 1, further comprising, responsive to the completion of the writing of the first transaction entry in the transaction log of the second node, writing first metadata associated with the first request in a transaction database of the second node.

6. The computer-implemented method of claim 1, wherein the first operation comprises one of a read operation, a write operation, and a delete operation associated with the first storage object.

7. The computer-implemented method of claim 1, further comprising:
while awaiting the first acknowledgment of the completion of the writing of the first transaction entry in the transaction log of the second node, requesting that the second node writes the one or more subsequent transaction entries in the transaction log of the second node based on the one or more subsequent requests.

8. The computer-implemented method of claim 1, wherein:
the one or more subsequent requests includes a plurality of subsequent requests;
the one or more operations includes a plurality of operations associated with the one or more storage objects; and
writing the one or more subsequent transaction entries in the transaction log of the first node based on the one or more subsequent requests includes, while awaiting the first acknowledgment:
sequentially writing a plurality of subsequent transaction entries in the transaction log of the first node based on the plurality of subsequent requests; and
requesting that the second node sequentially writes the plurality of subsequent transaction entries in the transaction log of the second node.

9. The computer-implemented method of claim 1, further comprising:
determining the failure to write the certain entry from the one or more subsequent transaction entries is in the transaction log of the second node;
determining a number of remaining nodes processing the certain request from the one or more subsequent requests that is associated with the certain entry; and
determining that the number of remaining nodes does not satisfy a threshold number, wherein terminating the processing of the certain request is further responsive to determining that the number of remaining nodes does not satisfy the threshold number.

10. The computer-implemented method of claim 1, further comprising:
requesting that the client retransmit the request.

11. A system, comprising:
a cluster of storage nodes including a first node and a second node; and
one or more node controllers associated with the cluster of storage nodes, the one or more node controllers including at least one processor configured to:
write a first transaction entry in a transaction log of the first node based on a first request for a first operation associated with a first storage object;
request the second node writes the first transaction entry in a transaction log of the second node based on the first request;
while awaiting a first acknowledgment of a completion of a writing of the first transaction entry in the transaction log of the second node, write one or more subsequent transaction entries in the transaction log of the first node based on one or more subsequent requests for one or more operations associated with one or more storage objects;
determine a failure to write a certain entry from the one or more subsequent transaction entries in one of the transaction log of the first node and the transaction log of the second node;
responsive to determining the failure, terminate a processing of a certain request from the one or more subsequent requests that is associated with the certain entry; and
provide a failure notification to a client that submitted the certain request associated with the certain entry.

12. The system of claim 11, wherein the one or more node controllers are further configured to:
responsive to receiving the first acknowledgment of the completion of the writing of the first transaction entry in the transaction log of the second node, write a first metadata associated with the first request in a transaction database of the first node.

13. The system of claim 12, wherein:
the first request is received via a computer network from a client;
the one or more subsequent requests are received via the computer network from one or more clients, wherein a subsequent request for an operation associated with a second storage object is received after writing the first metadata associated with the first request in the transaction database of the first node;
a subsequent transaction entry is written in the transaction log of the first node based on the subsequent request; and
the one or more node controllers are further configured to request the second node writes the subsequent transaction entry in the transaction log of the second node based on the subsequent request, wherein:
the subsequent transaction entry is written in the transaction log of the first node after the first metadata associated with the first request is written in the transaction database of the first node; and
the subsequent transaction entry is written in the transaction log of the second node after the first metadata associated with the first request is written in a transaction database of the second node.

14. The system of claim 12, wherein the one or more node controllers are further configured to:
request the second node writes a second transaction entry in the transaction log of the second node based on a second request included in the one or more subsequent requests;
receive a second acknowledgment of a completion of the writing of the second transaction entry in the transaction log of the second node; and
write a second metadata associated with the second request in the transaction database of the first node.

15. The system of claim 11, wherein the one or more node controllers are further configured to, responsive to the completion of the writing of the first transaction entry in the transaction log of the second node, write a first metadata associated with the first request in a transaction database of the second node.

16. The system of claim 11, wherein the one or more node controllers are further configured to, while awaiting the first acknowledgment of the completion of the writing of the first transaction entry in the transaction log of the second node, request the second node writes the one or more subsequent transaction entries in the transaction log of the second node based on the one or more subsequent requests.

17. The system of claim 11, wherein:
the one or more subsequent requests includes a plurality of subsequent requests;
the one or more operations includes a plurality of operations associated with the one or more storage objects; and
the one or more node controllers are further configured to, while awaiting the first acknowledgment:
sequentially write a plurality of subsequent transaction entries in the transaction log of the first node based on the plurality of subsequent requests; and
request the second node sequentially writes the plurality of subsequent transaction entries in the transaction log of the second node.

18. The system of claim 11, wherein the first node and the second node comprise a key-value store cluster.

19. The system of claim 11, wherein the first node is a master node and the second node is a slave node.

20. A system, comprising:
means for writing a first transaction entry in a transaction log of a first node based on a first request for a first operation associated with a first storage object;
means for requesting that a second node writes the first transaction entry in a transaction log of the second node based on the first request;
means for writing one or more subsequent transaction entries in the transaction log of the first node based on one or more subsequent requests for one or more operations associated with one or more storage objects, while awaiting a first acknowledgment of a completion of a writing of the first transaction entry in the transaction log of the second node;
means for determining a failure to write a certain entry from the one or more subsequent transaction entries in one of the transaction log of the first node and the transaction log of the second node;
means for terminating, responsive to determining the failure, a processing of a certain request from the one or more subsequent requests that is associated with the certain entry; and
means for providing a failure notification to a client that submitted the certain request associated with the certain entry.

* * * * *